(12) United States Patent
Jabara et al.

(10) Patent No.: US 11,176,596 B2
(45) Date of Patent: Nov. 16, 2021

(54) SYSTEM AND METHOD FOR WIRELESS COMMUNICATION TO PERMIT AUDIENCE PARTICIPATION

(71) Applicant: Mobilitie, LLC, Newport Beach, CA (US)

(72) Inventors: Gary B. Jabara, Newport Beach, CA (US); Lloyd Frederick Linder, Agoura Hills, CA (US); David Brett Simon, Agoura Hills, CA (US)

(73) Assignee: Mobilitie, LLC, Newport Beach, CA (US)

( * ) Notice: Subject to any disclaimer, the term of this patent is extended or adjusted under 35 U.S.C. 154(b) by 205 days.

(21) Appl. No.: 15/593,116

(22) Filed: May 11, 2017

(65) Prior Publication Data
US 2017/0249690 A1    Aug. 31, 2017

Related U.S. Application Data

(63) Continuation of application No. 15/278,484, filed on Sep. 28, 2016, now Pat. No. 10,387,946, which is a (Continued)

(51) Int. Cl.
*G06Q 10/08* (2012.01)
*G06Q 30/06* (2012.01)
(Continued)

(52) U.S. Cl.
CPC ......... *G06Q 30/0635* (2013.01); *A63F 13/27* (2014.09); *A63F 13/32* (2014.09);
(Continued)

(58) Field of Classification Search
CPC ....... H04W 4/02; H04W 64/00; H04W 84/12; H04W 88/08; H04W 4/029; H04W 4/021;
(Continued)

(56) References Cited

U.S. PATENT DOCUMENTS 6,414,635 B1 *  7/2002  Stewart ..................... G01S 5/12
                                                        342/457
6,845,389 B1   1/2005   Sen
(Continued)

FOREIGN PATENT DOCUMENTS

KR        20110019996 A  *  3/2011

OTHER PUBLICATIONS

International Search Report and Written Opinion in International Patent Application No. PCT/US2014/027566, dated Sep. 24, 2014, published Nov. 20, 2014, 15 pages.

*Primary Examiner* — Florian M Zeender
*Assistant Examiner* — Milena Racic
(74) *Attorney, Agent, or Firm* — Davis Wright Tremaine LLP; Michael J. Donohue

(57) ABSTRACT

User equipment (UE) includes a short-range transceiver configured for communication with a plurality of wireless access points (APs) distributed throughout a venue. The individual UEs can communicate with the venue via the APs. The UEs can be configured to play interactive games with the venue, some of which may be displayed on the large screen in the venue and others that are displayed on the display of the UE. Data may be sent to the UEs individually or in groups. The data may be in the form of advertising, text messaging, images, video, multimedia, or the like. An array of UEs can receive portions of an overall image and function as individual pixels in a large display.

20 Claims, 10 Drawing Sheets

Related U.S. Application Data continuation of application No. 13/834,001, filed on Mar. 15, 2013, now Pat. No. 9,510,148, which is a continuation-in-part of application No. 13/363,943, filed on Feb. 1, 2012, now Pat. No. 9,179,296, which is a continuation-in-part of application No. 13/093,998, filed on Apr. 26, 2011, now Pat. No. 8,995,923, which is a continuation-in-part of application No. 12/958,296, filed on Dec. 1, 2010, now Pat. No. 9,077,564, which is a continuation-in-part of application No. 12/616,958, filed on Nov. 12, 2009, now Pat. No. 8,190,119, which is a continuation-in-part of application No. 12/397,225, filed on Mar. 3, 2009, now Pat. No. 7,970,351.

(51) Int. Cl.

| | | |
|---|---|---|
| *H04W 4/80* | (2018.01) | |
| *H04W 8/00* | (2009.01) | |
| *H04L 29/08* | (2006.01) | |
| *G06Q 30/02* | (2012.01) | |
| *H04W 4/02* | (2018.01) | |
| *A63F 13/27* | (2014.01) | |
| *A63F 13/32* | (2014.01) | |
| *A63F 13/35* | (2014.01) | |
| *A63F 13/46* | (2014.01) | |
| *A63F 13/79* | (2014.01) | |
| *A63F 13/822* | (2014.01) | |
| *G06K 7/10* | (2006.01) | |
| *G06Q 50/12* | (2012.01) | |
| *G06F 16/29* | (2019.01) | |
| *H04W 88/06* | (2009.01) | |
| *H04W 84/18* | (2009.01) | |
| *G07C 13/00* | (2006.01) | |

(52) U.S. Cl.
CPC .............. *A63F 13/35* (2014.09); *A63F 13/46* (2014.09); *A63F 13/79* (2014.09); *A63F 13/822* (2014.09); *G06K 7/10861* (2013.01); *G06Q 30/0207* (2013.01); *G06Q 50/12* (2013.01); *H04L 67/10* (2013.01); *H04W 4/023* (2013.01); *H04W 4/80* (2018.02); *H04W 8/005* (2013.01); *A63F 2300/406* (2013.01); *A63F 2300/51* (2013.01); *A63F 2300/8023* (2013.01); *A63F 2300/8064* (2013.01); *G06F 16/29* (2019.01); *G07C 13/00* (2013.01); *H04W 84/18* (2013.01); *H04W 88/06* (2013.01)

(58) Field of Classification Search
CPC .. G06Q 30/02; G06Q 30/0601; G06Q 20/387; G06Q 10/0836; G06Q 50/01; G06Q 30/0261; G06Q 30/0239; G06Q 30/0259; G06Q 30/0267; G06Q 10/02; G06Q 30/0635; G06Q 30/0639; H04L 67/18; H04L 67/24

See application file for complete search history.

(56) References Cited

U.S. PATENT DOCUMENTS

| | | | |
|---|---|---|---|
| 7,792,539 B2 | 9/2010 | Inselberg | |
| 7,970,351 B2 | 6/2011 | Jabara | |
| 8,126,782 B1* | 2/2012 | Zhu | G06Q 20/203 705/26.25 |
| 8,190,119 B2 | 6/2012 | Jabara | |
| 8,414,372 B2 | 4/2013 | Cannon | |
| 8,657,688 B1 | 2/2014 | Zouiten | |
| 8,732,028 B2* | 5/2014 | Napper | G06Q 50/12 705/26.1 |
| 8,790,186 B1 | 7/2014 | Dethloff | |
| 8,858,313 B1 | 10/2014 | Selfors | |
| 8,864,566 B2 | 10/2014 | Snoddy | |
| 8,897,737 B2 | 11/2014 | Hahn | |
| 8,942,995 B1* | 1/2015 | Kerr | G07C 9/00 705/14.67 |
| 8,995,923 B2 | 3/2015 | Jabara | |
| 9,058,604 B2* | 6/2015 | Carr | G06Q 30/00 |
| 9,077,564 B2 | 7/2015 | Jabara | |
| 9,094,137 B1 | 7/2015 | Sehn | |
| 9,113,301 B1 | 8/2015 | Spiegel | |
| 9,179,296 B2 | 11/2015 | Jabara | |
| 9,510,148 B2 | 11/2016 | Jabara | |
| 9,578,188 B1 | 2/2017 | Kircher | |
| 9,928,536 B2* | 3/2018 | Fernandez | H04W 4/70 |
| 2003/0018524 A1* | 1/2003 | Fishman | H04L 67/306 705/14.52 |
| 2003/0054878 A1 | 3/2003 | Benoy | |
| 2004/0014422 A1 | 1/2004 | Kallio | |
| 2004/0043790 A1 | 3/2004 | Ben-David | |
| 2004/0116115 A1* | 6/2004 | Ertel | H04W 4/00 455/426.2 |
| 2006/0068917 A1 | 3/2006 | Snoddy | |
| 2006/0116167 A1 | 6/2006 | Raviv | |
| 2006/0189382 A1 | 8/2006 | Muir | |
| 2006/0227673 A1 | 10/2006 | Yamashita | |
| 2006/0236240 A1 | 10/2006 | Lebow | |
| 2006/0271552 A1* | 11/2006 | McChesney | G06Q 30/02 |
| 2006/0291455 A1 | 12/2006 | Katz | |
| 2007/0018952 A1 | 1/2007 | Arseneau | |
| 2007/0047949 A1 | 3/2007 | Gluck | |
| 2007/0130217 A1 | 6/2007 | Linyard | |
| 2007/0155506 A1 | 7/2007 | Malik | |
| 2007/0156883 A1 | 7/2007 | Thompson | |
| 2007/0214182 A1 | 9/2007 | Rosenberg | |
| 2008/0004888 A1* | 1/2008 | Davis | G06Q 20/3224 705/26.1 |
| 2008/0062940 A1* | 3/2008 | Othmer | H04L 67/18 370/338 |
| 2008/0096659 A1 | 4/2008 | Kreloff | |
| 2008/0239160 A1 | 10/2008 | Ho et al. | |
| 2009/0005141 A1 | 1/2009 | Lehtiniemi | |
| 2009/0096593 A1 | 4/2009 | Dakers | |
| 2009/0210512 A1 | 8/2009 | Steinhart | |
| 2009/0253476 A1 | 10/2009 | Pestotnik | |
| 2010/0017725 A1 | 1/2010 | McCarthy et al. | |
| 2010/0107225 A1* | 4/2010 | Spencer | G06F 21/85 726/4 |
| 2010/0142928 A1 | 6/2010 | Rohde | |
| 2010/0306064 A1 | 12/2010 | Inselburg | |
| 2011/0029894 A1 | 2/2011 | Eckstein | |
| 2011/0282700 A1* | 11/2011 | Cockcroft | G06Q 10/02 705/5 |
| 2011/0300946 A1 | 12/2011 | Stafford | |
| 2012/0059729 A1* | 3/2012 | Roa | G06Q 30/02 705/26.1 |
| 2012/0072561 A1 | 3/2012 | Rebacz | |
| 2012/0135711 A1 | 3/2012 | Jabara | |
| 2012/0105466 A1 | 5/2012 | Leslie | |
| 2012/0329429 A1 | 12/2012 | Jabara | |
| 2013/0311566 A1 | 11/2013 | Milburn et al. | |
| 2013/0326587 A1* | 12/2013 | Zhu | H04W 88/02 726/3 |
| 2013/0346877 A1 | 12/2013 | Borovoy | |
| 2014/0046802 A1* | 2/2014 | Hosein | G01R 1/06711 705/26.61 |
| 2014/0087883 A1 | 3/2014 | Lee | |
| 2014/0149241 A1* | 5/2014 | Neuneker | G06Q 20/20 705/21 |
| 2015/0033247 A1 | 1/2015 | Lentzitzky | |
| 2015/0189535 A1 | 7/2015 | Bekiares | |
| 2015/0271113 A1 | 9/2015 | Ahn | |
| 2015/0312709 A1 | 10/2015 | Dominici | |
| 2016/0099901 A1 | 4/2016 | Allen | |
| 2016/0182422 A1 | 6/2016 | Sehn | |
| 2016/0330258 A1 | 11/2016 | Sandhu | |

(56) References Cited

U.S. PATENT DOCUMENTS

2017/0014716 A1    1/2017   Jabara
2017/0264661 A1    9/2017   Hobson et al.
2017/0301043 A1   10/2017   Soli

* cited by examiner

SYSTEM AND METHOD FOR WIRELESS COMMUNICATION TO PERMIT AUDIENCE PARTICIPATION

RELATED APPLICATIONS

This application is a Continuation of U.S. patent application Ser. No. 15/278,484, filed Sep. 28, 2016; which is a Continuation of U.S. patent application Ser. No. 13/834,001, filed Mar. 15, 2013, now U.S. Pat. No. 9,510,148; which is a Continuation-In-Part of U.S. patent application Ser. No. 13/363,943, filed Feb. 1, 2012, now U.S. Pat. No. 9,179,296; which is a Continuation-In-Part of U.S. patent application Ser. No. 13/093,998, filed Apr. 26, 2011, now U.S. Pat. No. 8,995,923, which is a Continuation-In-Part of U.S. patent application Ser. No. 12/958,296, filed Dec. 1, 2010, now U.S. Pat. No. 9,077,564; which is a Continuation-In-Part of U.S. patent application Ser. No. 12/616,958, filed Nov. 12, 2009, now U.S. Pat. No. 8,190,119, which is a Continuation-In-Part of U.S. patent application Ser. No. 12/397,225, filed Mar. 3, 2009, now U.S. Pat. No. 7,970,351, the entire disclosures and content of which are hereby incorporated by reference in their entirety.

BACKGROUND OF THE INVENTION

Field of the Invention

The present invention is directed generally to wireless communication devices and, more particularly, to a system and method of network management to permit audience interaction with a venue using wireless communication devices.

Description of the Related Art

Wireless communication networks have become commonplace. A vast array of base stations is provided by a number of different wireless service providers. Wireless communication devices, such as cell phones, personal communication system (PCS) devices, personal digital assistant (PDA) devices, and web-enabled wireless devices communicate with the various base stations using one or more known communication protocols. While early cell phone devices were limited to analog operation and voice-only communication, modern wireless devices use digital signal protocols and have sufficient bandwidth to enable the transfer of voice signals, image data, and even video streaming. In addition, web-enabled devices provide network access, such as Internet access.

In all cases, the individual wireless communication devices communicate with one or more base stations. Even when two wireless communication devices are located a few feet from each other, there is no direct communication between the wireless devices. That is, the wireless devices communicate with each other via one or more base stations and other elements of the wireless communication network.

Some wireless service providers have included push-to-talk (PTT) technology that allows group members to communicate with each other using PTT technology. Thus, when one group member presses the PTT button, the communication from that individual is automatically transmitted to the communication devices of other group members. While this gives the appearance of direct communication between the wireless devices, the communications between group members are also relayed via one or more base stations as part of the wireless network.

Therefore, it can be appreciated that there is a need for wireless communication devices that can communicate directly with nearby wireless devices. The present invention provides this, and other advantages, as will be apparent from the following detailed description and accompanying figures.

BRIEF DESCRIPTION OF THE SEVERAL VIEWS OF THE DRAWING(S)

DETAILED DESCRIPTION OF THE INVENTION

The system described herein extends the normal operational features of conventional wireless communication devices. As described above, the conventional wireless communication device sometimes referred to as user equipment (UE) communicates with a wireless communication network base station using a first transceiver (i.e., a network transceiver). The extended capabilities described herein provide a second transceiver device that allows UEs to communicate directly with each other over a short distance and further describes network management techniques capable of managing a dynamic network that may change quickly. The term UE is intended to include any wireless communication device capable of processing audio, video, and text messaging. This includes smart phones, laptops, PDAs, computer tablets (e.g., an iPad™) and the like.

Figure 1:
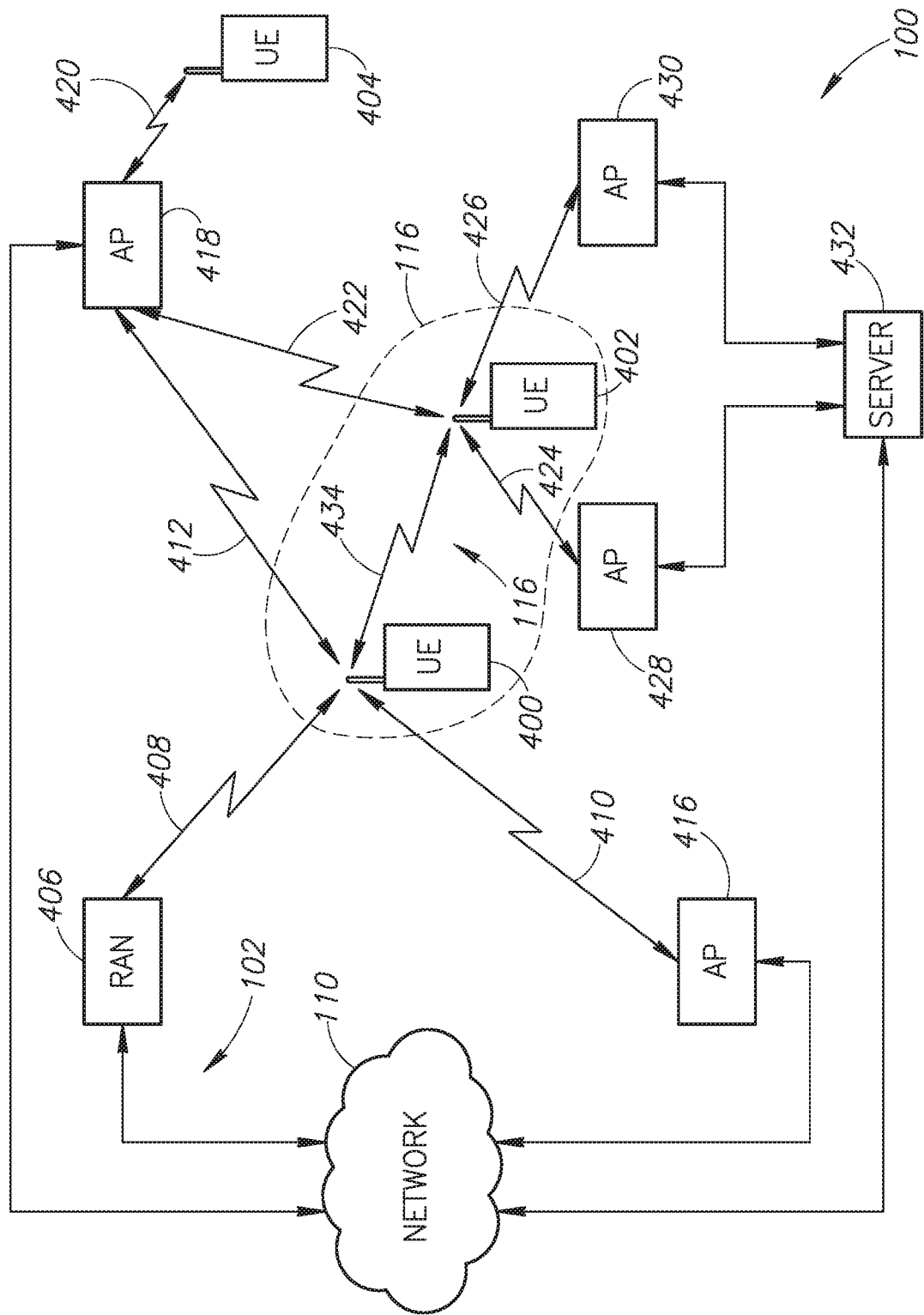
FIG. 1 is an example network architecture of a dynamic network illustrating communication between user equipment, wireless access points, and a wireless service provider network.

The wireless communication devices are illustrated as part of a system 100 illustrated in the system architecture in FIG. 1. FIG. 1 illustrates UEs 400-404 in a venue such as a shopping mall. The UE 400 uses a network transceiver 166 (see FIG. 2) to communicate with a radio access network (RAN) 406. The RAN 406 is intended to generically represent a base station and any associated support circuitry. The UE 400 establishes a wireless communication link 408 with the RAN 406 in a conventional manner. The RAN 406 is illustrative of the network transceiver portion of wireless networks, sometimes referred to as a public land mobile network (PLMN) 102 that may be successfully implemented using, by way of example, CDMA, WCDMA, GSM, UMTS, 3G, 4G, LTE, and the like. The system 100 is not limited by any specific communication protocol for the PLMN 102. FIG. 1 also illustrates that the RAN 406 is part of the PLMN 102.

FIG. 1 also illustrates wireless communication links 410-412 coupling the UE 400 with access points (APs) 416-418, respectively. In a typical shopping mall setting, the APs 416-418 may typically be associated with different stores in the shopping mall. As such, the APs associated with different stores will each have a different feature set and are controlled by a separate server. Each AP may have its own operational policy and policy server or policy engine. In addition, each AP may or may not allow device-to-device communication (i.e., communication between the UEs). Furthermore, each AP may or may not allow access to the Internet (e.g., the network 110). For example, the AP 416 may or may not allow the UE 400 to access the network 110 based on the particular policies implemented by the AP 416.

In one embodiment, the UE (e.g., the UE 400) must log on and register with each AP (e.g., the AP 416) in order to establish the wireless communication link 410 to receive ads or other content from the AP 416. As the UE 400 moves into range of another AP (e.g., the AP 428), the UE 400 can perform another log on and authentication process with the new AP. In an alternative embodiment, described in greater detail below, the various stores may become part of a larger Cloud network and permit automatic authentication of a UE whenever it comes within range of the AP.

FIG. 1 also illustrates the UE 404 communicating with the AP 418 via the wireless communication link 420. The UE 402 also communicates with the AP 418 via a wireless communication link 422. In FIG. 1, the UE 402 establishes wireless communication links 424-426 with APs 428-430, respectively. In the example if FIG. 1, the AP 428 and the AP 430 may be co-located in the same store and are coupled to a server 432. In this embodiment, the two APs 428-430 form a network back bone that creates a tether for multiple phones within the store in which the APs are located. As the customer moves throughout the store, the UE 402 will connect to the AP 428 or the AP 430 depending on the signal strength. If other UEs come within range of the APs 428-430, the UEs may communicate for the all the purposes described above either directly or via the WiFi AP mesh network formed by the APs 428-430.

As will be described in greater detail below, the server 432 may control the flow of data to and from the UE 402 via the AP 428 and/or the AP 430. Those skilled in the art will appreciate that the APs (e.g., the AP 416) can be implemented in a variety of fashions. In one embodiment, the AP 416 may be directly coupled to a service provider. For example, the AP 416 may be implemented as a cable modem with a wireless connectivity for the UE 400. In another embodiment, the AP 416 may be coupled to a computer (not shown) which controls operation of the AP 416 as well as controlling communications with the network 110. In this embodiment, the network 110 may be a wide area network, such as the Internet.

In addition to the various wireless communication links between the UE 400 and the RAN 406 and/or the AP 416-418, the UE 400 can establish a wireless communication link 434 with the UE 402. The wireless communication link 434 is established using the short-range transceiver 176 (see FIG. 2) thus permitting the UE 400 and 402 to establish the short-range communication network 116.

In the example of FIG. 1, the AP 416 and AP 418 may be access points for different businesses. As the UE 400 moves within range of the AP 416, the wireless communication link 410 is established and the AP 416 may disseminate business information, such as messages, coupons, advertisements, and the like. Similarly, when the UE 400 moves within range of the AP 418, the wireless communication link 412 is established and the UE 400 may receive business information from the AP 418. As will be described in detail below, some or all of the message data received from the AP 416 via the wireless communication link 410 may be relayed from the UE 400 to the UE 402 via the wireless communication link 434. Thus, message data from the business associated with the AP 416 may be disseminated to other UEs (the UE 402 in FIG. 1) via the short range communication network 116. As will be discussed in detail below, a UE may serve as a hot spot in a short-range communication network 116. However, in some settings, such as the shopping mall example illustrated in FIG. 1, there is generally sufficient coverage provided by the APs spread throughout the shopping mall. Thus, the short-range communication networks may typically be established using an AP. As will be discussed in greater detail below, a verification system can be used to assure the authenticity of the information received by the UE 400 from the AP 416 and the AP 418.

Figure 2:
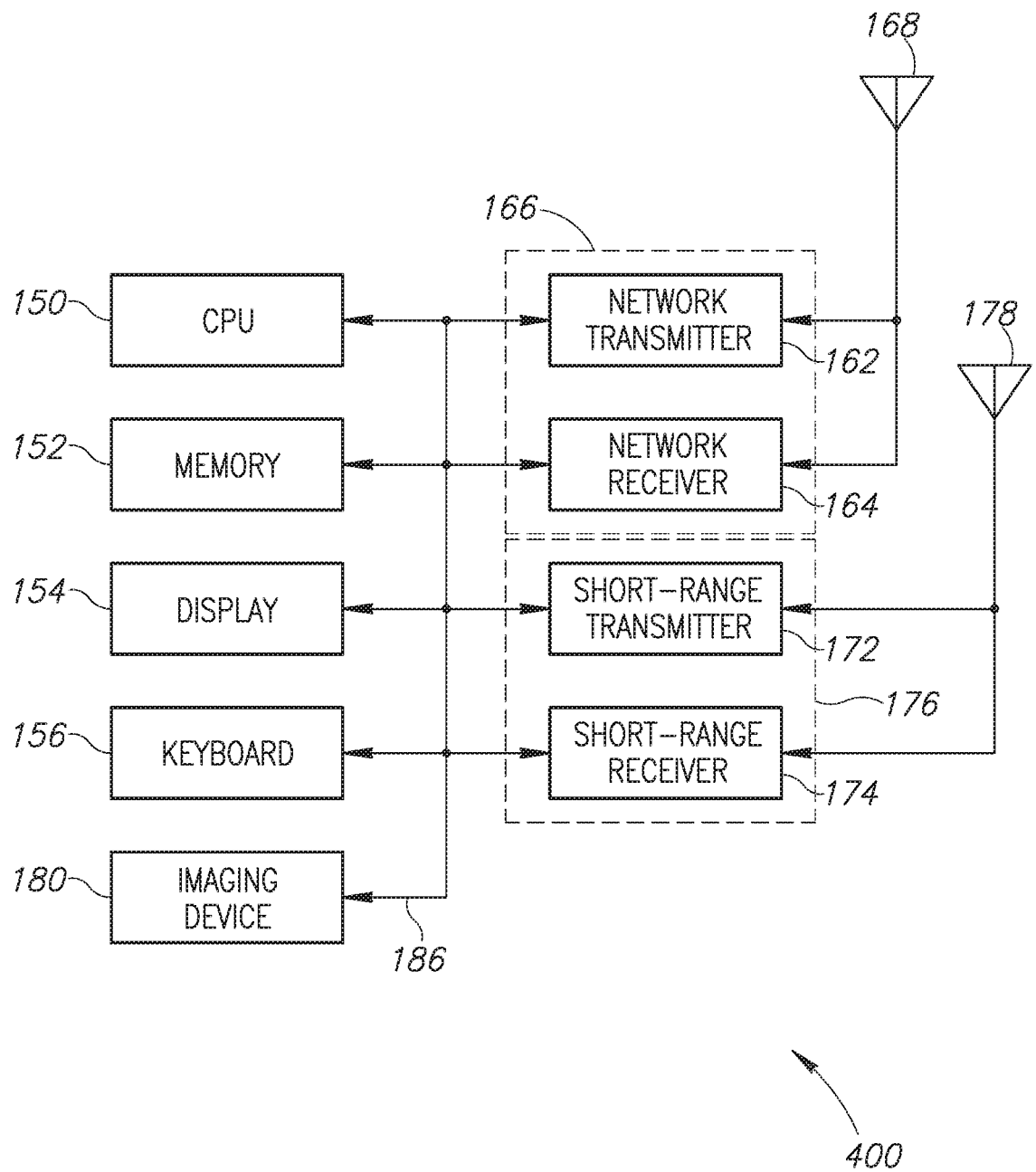
FIG. 2 is functional block diagram of one of the wireless communication devices of FIG. 1.

FIG. 2 is a functional block diagram illustrative of one of the UEs 400-404 illustrated in FIG. 1 (e.g., the UE 400). The UE 400 includes a central processing unit (CPU) 150. Those skilled in the art will appreciate that the CPU 150 may be implemented as a conventional microprocessor, application specific integrated circuit (ASIC), digital signal processor (DSP), programmable gate array (PGA), or the like. The UE 400 is not limited by the specific form of the CPU 150.

The UE 400 in FIG. 2 also contains a memory 152. In general, the memory 152 stores instructions and data to control operation of the CPU 150. The memory 152 may include random access memory, ready-only memory, programmable memory, flash memory, and the like. The UE 400 is not limited by any specific form of hardware used to implement the memory 152. The memory 152 may also be integrally formed in whole or in part with the CPU 150.

The UE 400 of FIG. 2 also includes conventional components, such as a display 154 and a keypad or keyboard 156. These are conventional components that operate in a known manner and need not be described in greater detail. Other conventional components found in wireless communication devices, such as a USB interface, Bluetooth interface, infrared device, and the like, may also be included in the UE 400. For the sake of clarity, these conventional elements are not illustrated in the functional block diagram of FIG. 2.

The UE 400 of FIG. 2 also includes a network transmitter 162 such as may be used by the UE 400 for the conventional wireless communication network with the RAN 406 (see FIG. 1). FIG. 2 also illustrates a network receiver 164 that operates in conjunction with the network transmitter 162 to communicate with the RAN 406. In a typical embodiment, the network transmitter 162 and network receiver 164 share circuitry and are implemented as a network transceiver 166. The network transceiver 166 is connected to an antenna 168. The network transceiver 166 is illustrated as a generic transceiver. As previously noted, the mobile communication devices (e.g., the UEs 400-402) may be implemented in accordance with any known wireless communication protocol including, but not limited to, CDMA, WCDMA, GSM, UMTS, 3G, 4G, WiMAX, LTE, or the like. Operation of the network transceiver 166 and the antenna 168 for communication with the PLMN 102 is well-known in the art and need not be described in greater detail herein.

The UE 400 of FIG. 2 also includes a short-range transmitter 172 that is used by the UE for direct communication with other jump-enabled wireless communication devices (e.g., the UE 402 of FIG. 1). FIG. 2 also illustrates a short-range receiver 174 that operates in conjunction with the short-range transmitter 172 to communicate directly with other jump-enabled wireless communication devices (e.g., the UE 402 of FIG. 1). In a typical embodiment, the short-range transmitter 172 and short-range receiver 174 are implemented as a short-range transceiver 176. The short-range transceiver 176 is connected to an antenna 178. In an exemplary embodiment, the antennas 168 and 178 may have common components are implemented as a single antenna.

FIG. 2 also illustrates an imaging device 180. As is well known with modern communication devices, the imaging device is typically a solid state (e.g., CCD) imaging device and lens. The imaging device 180 is capable of still images or video images. As will be described in detail below, the imaging device is used for audience interaction with a venue. Images captured by the imaging device 180 may include data, such as time and location data related to the capture of the image or video data.

The various components illustrated in FIG. 2 are coupled together by a bus system 186. The bus system may include an address bus, data bus, power bus, control bus, and the like. For the sake of convenience, the various busses in FIG. 2 are illustrated as the bus system 186.

In an exemplary embodiment, the short-range transceiver 176 may be designed for operation in accordance with IEEE standard 802.11, sometimes referred to as WiFi. Many modern wireless communication devices are equipped with WiFi and may be readily upgraded to support the functionality described herein. A technique for establishing direct communication between the UEs using WiFi is described in U.S. application Ser. No. 12/397,225, filed on Mar. 3, 2009, now U.S. Pat. No. 7,970,351. As described therein, the UEs will establish a direct wireless communication link whenever they are within proximity of each other. In FIG. 1, the UE 400 and UE 402 are within range of each other and establish the wireless communication link 434 directly between the UEs, thus dynamically forming a short-range communication network 116. Because the UEs 400-402 all include WiFi capability, a short-range communication network 116 may be formed even though the UEs may be designed to operate with incompatible PLMNs 102. For example, the UE 400 may be configured for operation with a GSM implementation of the PLMN 102 while the UE 402 may be configured for operation with a CDMA implementation of a PLMN. Even though the UEs 400-402 are incompatible with respect to the respective PLMNs 102, the UEs 400-402 may still communicate directly with each other via the short-range communication network 116. Thus, the UEs may operate compatibly to form the short-range communication networks 116 even though the network transceivers 166 (see FIG. 2) may operate with different incompatible PLMNs.

Various techniques for establishing the short-range communication network 116 (see FIG. 1) are described in U.S. application Ser. No. 12/397,225 filed on Mar. 3, 2009, now U.S. Pat. No. 7,970,351, U.S. application Ser. No. 12/616,958 filed on Nov. 12, 2009, U.S. application Ser. No. 12/958,296, filed on Dec. 1, 2010, and U.S. application Ser. No. 13/093,988 filed on Apr. 26, 2011, the entire disclosures and content of which are hereby incorporated by reference in their entirety.

As will be discussed in greater detail below, the system 100 goes beyond some of the conventional operation of WiFi standards to permit a large number of UEs to communicate directly with each other. In one embodiment, a local hot spot is used to initiate the formation of the short-range communication network 116. Once established, the short-range communication network 116 may continue to exist even if the hot spot (or group owner) is no longer present. In yet another alternative embodiment, described below, the UEs may be pre-programmed to utilize a common SSID, IPrange, and port to spontaneously form a short-range communication network 116 even in the absence of any hot spot.

In an exemplary embodiment of the system 100, each UE (e.g., the UEs 400-404) transmits a beacon signal with the same SSID, such as the SSID "JUMMMP" to identify the device. In addition, the beacon frame includes several other data fields such as a media access layer (MAC) address for source and destination. In the beacon frame, the destination MAC address is set to all ones to force other wireless communication devices to receive and process the beacon frame. The beacon frame used in the system 100 may also include conventional elements, such as a time stamp used for synchronization with other wireless devices, information on supported data rates, parameter sets that indicate, for example, transceiver operational parameters such as the IEEE 802.11 channel number and signaling method such as operation at the physical layer (PHY) and operation in a direct frequency spectrum (DSSS) or a frequency hopping spread spectrum (FHSS) operational modes. These conventional WiFi parameters are known in the art and need not be described in greater detail herein.

In addition, when there is no access point, all jump-enabled wireless communication devices take on the responsibilities of the MAC layer that controls, manages, and maintains the communication between the jump-enabled wireless communication devices by coordinating access to the shared radio channel and the protocols that operate over the wireless medium. In an exemplary embodiment, the MAC is implemented in accordance with IEEE 802.2. At the PHY layer, the transceiver may operate in a DSSS or a FHSS operational mode. Alternatively, the PHY layer may be implemented using infrared transceivers. The IEEE 802.11 standard defines a common operation whether devices are using the ad hoc or the infrastructure mode. The use of the ad hoc mode only affects protocols, so there is no impact on the PHY layer. Thus, the wireless communication device 120 may operate under IEEE 802.11a at 5 gigahertz (GHz) under IEEE 802.11b/g at 2.4 GHz, or IEEE 802.11n, which operates at both 2.4 GHz and 5 GHz. Those skilled in the art will appreciate that the wireless communication device of the system 100 may be readily adapted for operation with future versions of IEEE 802.11.

In an alternative embodiment, the wireless communication devices 120-128 may be configured in accordance with IEEE WiFi Direct standards. WiFi Direct allows any wireless communication device in the short-range communication network 116 to function as the group owner. WiFi Direct simplifies the process of establishing a communication link. For example, the WiFi protected set up allows a communication link to be established by entering a PIN or other identification or, simply pressing a button. As will be described herein, the UEs actively seek to establish links with other UEs to automatically establish a short-range communication network 116.

The system 100 permits the exchange of messages data directly between UEs and between a UE and an AP. In an exemplary embodiment, the messages may be categorized as Public Messages, Group Messages, Direct Messages, and Status Messages. Public Messages may be transmitted to anyone within range of the UE (e.g., the UE 120). This may include emergency messages, messages broadcast from a retailer, and the like. Group Messages are intended for a specific group or organization, such as a scout group or employees of a particular company or any formed group. Direct Messages are private messages intended for a specific individual. In addition, the UE 120 may transmit Status Messages, which can include, by way of example, a list of other UEs in the particular short-range communication network 116, a list of recent UEs in the particular short-range communication network, a list of other short-range communication networks in which the wireless communication device was recently a member, or the like. The data message process described above can include one or more of these message categories. Other message categories may be created as necessary.

U.S. patent application Ser. No. 13/093,998, entitled "SYSTEM AND METHOD FOR MANAGEMENT OF A DYNAMIC NETWORK USING WIRELESS COMMUNICATION DEVICES," FILED ON Apr. 26, 2011, and incorporated by reference in its entirety, provides additional details of the message exchange process. As described therein, the Public and Group Messages may be contained in one file and all Direct Messages contained in a separate file. The messages have a main header and individual message headers. The main header may include, by way of example, the date/time of the last modification, message count, the date/time of the last synchronization and the user name of the wireless communication device with which the last synchronization was performed. This information may help maintain synchronization between UEs.

The message data may include, but is not limited to, text message data, audio data, video data, multimedia data, or the like. As those skilled in the art will appreciate, Public Messages may be received and processed by any wireless communication device. In contrast, Group Messages may only be processed by a member of the designated group, while a Direct Message may only be processed by the individual UE for whom the message is intended.

Synchronization may occur directly between the UEs or via the access point 418 illustrated in FIG. 1. For example, message synchronization can occur between the UE 400 and the UE 404 using the AP 418. In addition, UEs can carry message data as they move from one short-range communication network 116 to another.

In another embodiment, a retail business may broadcast Public Messages to nearby UEs. In an exemplary embodiment, the retail facility can set up a wireless access point (e.g., the wireless access point 428 in FIG. 1) to establish a short-range communication network 116. For example, a retail facility in a shopping mall can use the AP 430 in FIG. 1 to transmit advertisement messages to nearby wireless communication devices (e.g., the UE 402). In a typical embodiment, these would be Public Messages that are freely relayed from one UE to another (e.g., from the UE 402 to the UE 400) and from one short-range wireless communication network 116 to another. Using this form of message distribution, an advertisement from a retail facility will soon be disseminated to all wireless users in the area. The advertisements may take the form of text messages or any other data message described above.

In another aspect, an individual user may register with a business. Whenever the user comes within range of the short-range communication network 116 associated with the retail business, message data may be exchanged thus enabling the business to identify a particular user that is nearby. In this embodiment, the retail business may send a private advertisement message to the particular user. The private advertisement may be customized for the user based on a number of factors, such as the user's profile (e.g., the sex, age, and interests of the user), prior shopping patterns, or the like. It can also be based on statistical and history data that the retail business has collected on the user in one or more short-range communication networks 116 in the region around the retail business. For example, if a particular user has registered with a restaurant and comes within range of the short-range communication network 116 of that restaurant at a subsequent time after registration, the restaurant can send a private advertisement message to entice that user into the restaurant by offering a discount on a meal previously purchased by that user. If the user is a sports enthusiast, a sports bar could send a message that a particular sporting event (e.g., the user's college football team) is ongoing and offer a discount on a meal. In this manner, highly customized advertisements may be sent to individual users.

In some situations, the user may not be within range of the short-range communication network 116 of the restaurant, but may still be nearby. Because the UEs in the various short-range communication networks 116 relay messages, any message from a particular user may be relayed to the retail business via one or more short-range communication networks 116. Thus, a business at one end of a mall may detect the arrival of a particular user at the opposite end of the mall and still transmit a customized advertisement message to that user.

In another example application of the system 100, a business may utilize the short-range communication networks 116 to disseminate business information in the form of messages, coupons, advertisements, and the like. In addition, a wireless communication device may communicate with multiple vendors within a particular venue and receive information that varies from one venue to another.

The user of a conventional wireless communication device can search for a wireless access point and connect to that access point, as is common in public areas, such as an airport terminal, coffee shop, or the like. The goal of this connection is generally to provide Internet access. However, the UEs described herein can include an application program interface (API) that can be programmed into the UE at the time of manufacture or downloaded in a conventional manner. Some functionality of the API will be described herein. A more complete description of the API is provided by U.S. patent application Ser. No. 13/093,998 and titled System and Method for Management of a Dynamic Network Using Wireless Communication Devices, filed on Apr. 26, 2011 and incorporated herein by reference in its entirety. The API becomes part of the operating system in that it is always executing in the background. In this manner, the API is different from a conventional application software program that must be activated by the user. In one aspect, the API includes a "heartbeat" signal that periodically communicates with any available AP and provides identification data, location data and the like. In addition, the API advantageously simplifies authentication of the UE whenever it enters a venue that is part of the system described herein.

In FIG. 1, the UE 402 has established wireless communication links 424-426 with the APs 428-430, respectively. As noted above, these APs may be in a large business. As the user moves from one department to another or from one store level to another, he may move in or out of range of one AP or the other. Thus, the information provided to the UE 402 may be customized for the user based on the user's current location within the business.

Figure 3:
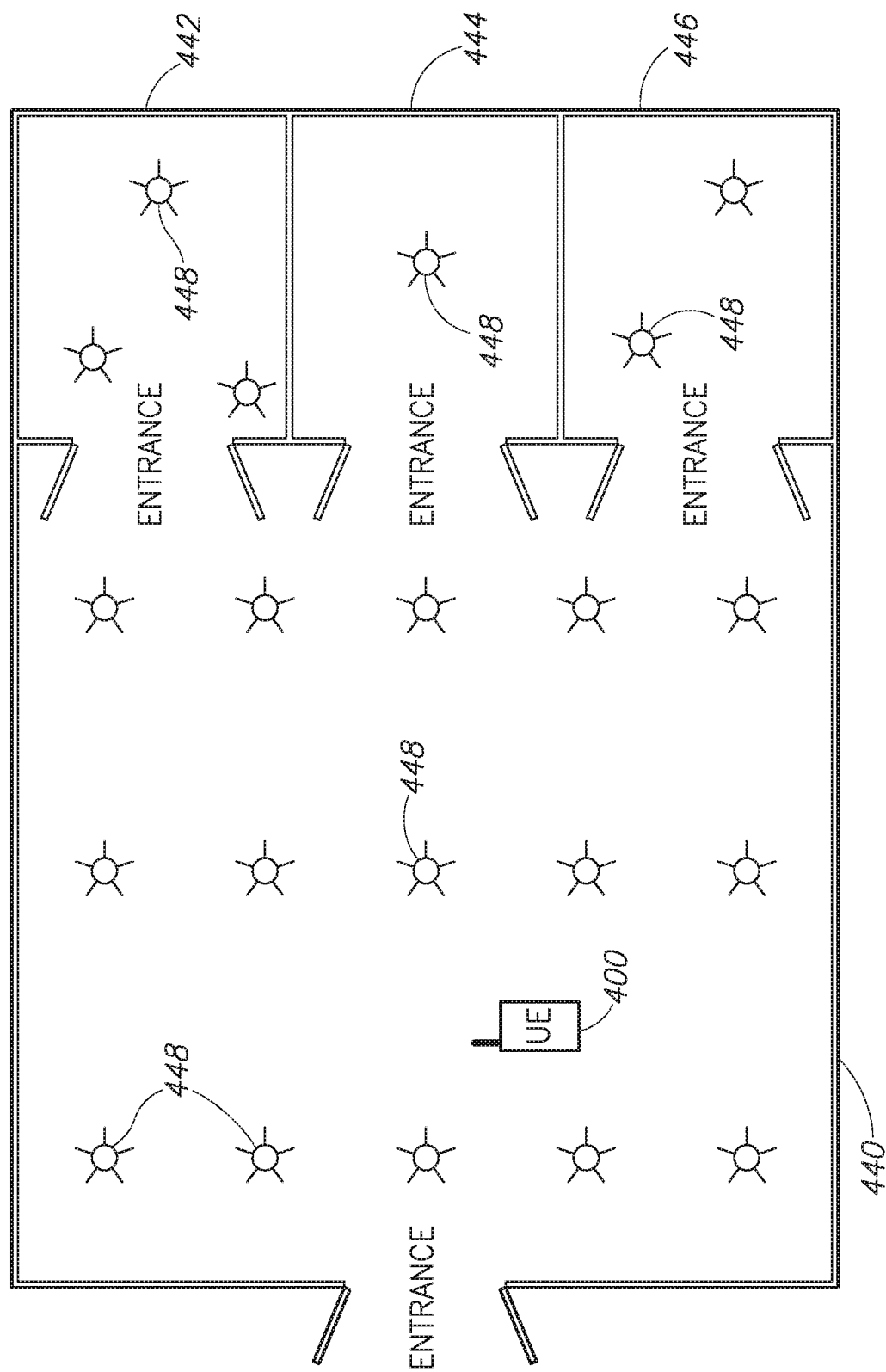
FIG. 3 illustrates a venue with a large number of distributed wireless access points.

FIG. 3 illustrates a large venue 440, such as a casino. In such a large venue, there may be related businesses 442-446 located within or near the venue 440. In the casino example, the related business 442 may be a performance venue for singers, comedy acts, and the like. The related business 444 may be a nightclub while the related business 446 may be a restaurant.

Due to the large size of the venue 440, it may be necessary to deploy a network of APs, illustrated by the reference number 448. The position and coverage area of the APs 448 can be determined based on the particular hardware implementation. The actual distribution and installation of the APs 448 within the venue 440 is within the engineering knowledge of one skilled in the art and need not be described in greater detail herein.

Figure 4:
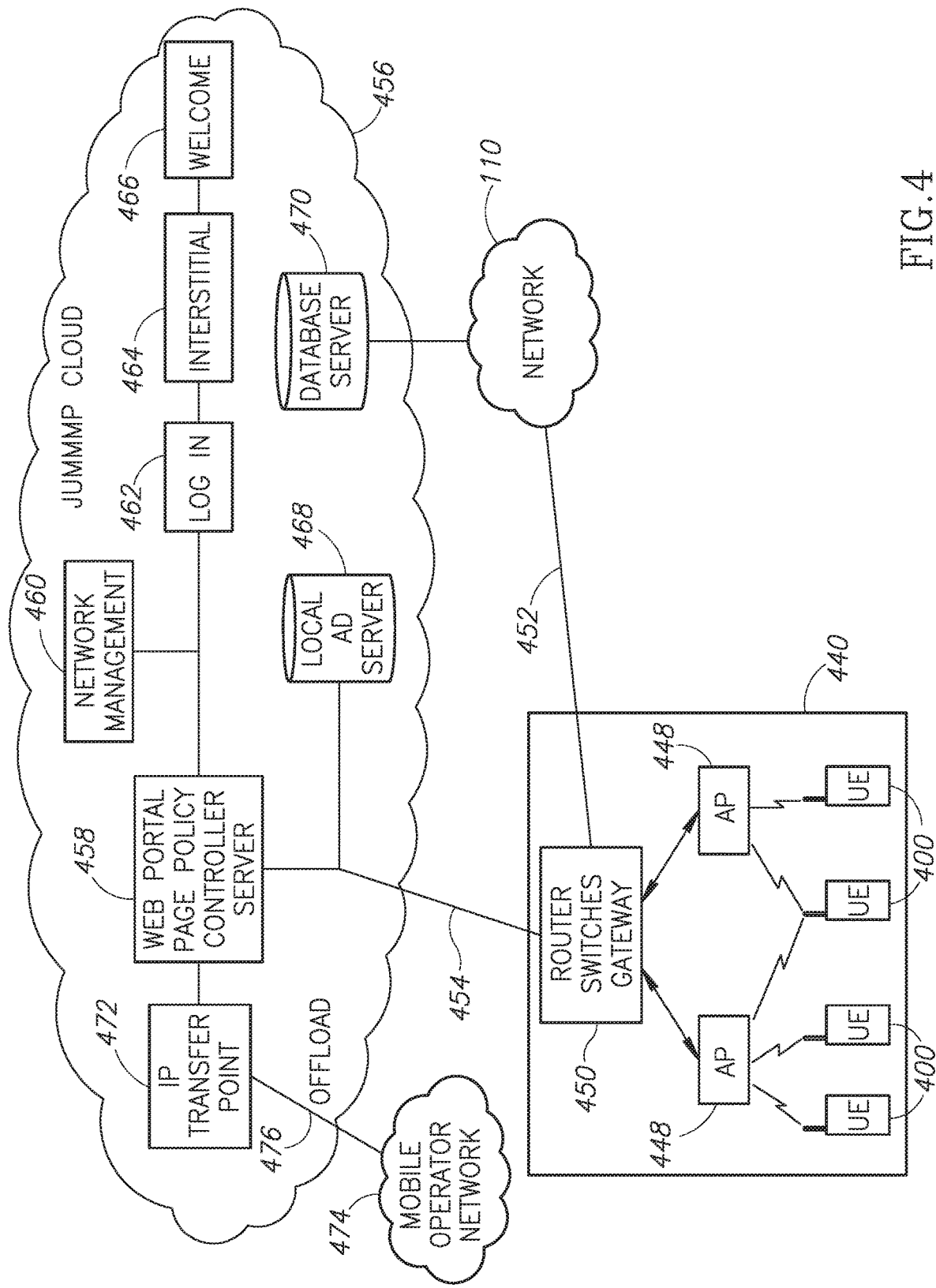
FIG. 4 illustrates a system architecture in which a venue communicates with a Cloud network.

In the embodiment of FIG. 3, all of the APs 448 may be coupled to a server (e.g., the server 432 in FIG. 1) or a gateway 450 (see FIG. 4). As the UE 400 moves throughout the venue 440, it is making and breaking wireless communication devices with one or more of the APs 448. The identity of the UE 400 can be verified by the UE providing a profile and user information and signing up for the WiFi service and downloading the API in exchange for free WiFi service. Initially this may be accomplished through a portal page, as will be described in greater detail below.

Once the identity of the UE 400 has been verified, the server 432 can provide customized messages to the owner of the UE 400. While the UE 400 remains within the venue 440, it is in substantially continuous contact with the APs 448 and may receive data therefrom. For example, the UE 400 could receive an ad for free or discounted tickets to the performance venue 442 or an invitation to happy hour at the nightclub venue 444 or a discounted meal at the restaurant venue 446. If the owner of a UE 400 is not a registered guest at a hotel within the venue 440, the APs 448 could send an invitation or ad to book a room in the venue 440. The UE 400 can communicate with the server 432 via the APs 448 to accept one or more of the ad offers. For example, the UE 400 could transmit an acceptance and book tickets at the performance venue 442. Similarly, the user of the UE 400 can book a room in the venue 440.

The venue 440 can establish virtually continuous wireless communication links with the UE 400 and provide a stream of ad content (e.g., ads, offers, discounts, etc.) for the venue 440 and the related businesses 442-446. Thus, the stream of ad data to the UE 400 may be for the venue 440 and the related businesses 442-446. Alternatively, the venue 440 may provide advertising for a different venue (not shown). For example, if the venue 440 is a casino in a large city, such as Las Vegas, the server 432 may provide ad content for a related business down the street or even for a third-party business with whom the venue 440 has contracted to provide advertising to the UE 400. For example, the AP 448 may provide advertising for a convention at a different venue or for a boxing match at a different venue. Thus, advertising content may or may not be related to the venue 440 in which the UE 400 is presently located.

FIG. 4 illustrates a system architecture that allows operation of the system across multiple venues. As discussed above with respect to FIG. 3, the venue 440 may have a large number of APs 448 distributed throughout the venue. The various APs are coupled together using routers, switches, and the like. Those routers, switches and gateways are illustrated in FIG. 4 by the reference 450. Among other things, the gateway 450 allows an interconnection to the network 110 via a communication link 452, but could be any wide area network. In a typical embodiment, the network 110 may be implemented as the Internet. In addition to the communication link 452, the gateway 450 provides a backhaul 454 to a cloud computing environment designated as a JUMMMP Cloud 456. The backhaul 454 may be implemented in a variety of different manners using known technology. In one embodiment, the backhaul 454 may be routed to the JUMMMP Cloud 456 via the network 110.

Within the JUMMMP Cloud 456 are a number of components. A web portal page and policy controller server 458 controls user authentication across a number of different venues in addition to the venue 440. A network management element 460 controls overall operation of the network in the JUMMMP Cloud 456.

FIG. 4 illustrates a number of different web pages that may be downloaded to the UE 400 in the venue 440. In one embodiment, the venue 440 may include its own server and store its own portal pages. However, such an architecture requires that each venue have a separate server to support this functionality. The system in FIG. 4 advantageously utilizes the web portal page server and policy controller server 458 for multiple venues. The JUMMMP Cloud 456 may have some common pages for all venues, such as a log-in web page 462. However, even the log-in web page may be unique to the venue 440.

In addition to the log-in web page 462, the JUMMMP Cloud 456 may have one or more interstitial web pages 464. For example, interstitial web pages may display information about the venue 440 (or advertising for businesses within the venue, third party advertising, or advertising for other venues within the JUMMMP network) while the user is waiting for completion of the registration verification process. In addition, the JUMMMP Cloud 456 may include one or more welcome web pages 466. The welcome web pages 466 may offer various services, such as a credit card data entry page, and Internet access sign-up page, a voucher code entry page to permit the user to enter discount voucher data, and the like. For example, the initial registration can provide WiFi connectivity at a certain service level, such as a basic bandwidth. However, the welcome pages may include an offer to upgrade WiFi connectivity to a higher bandwidth for an advertised price. If the user is a guest at the venue 440, the charge can be automatically made to the user's room. In another embodiment, the user's phone may be charged for the upgraded bandwidth service. Other similar services may be provided in the welcome web pages 466.

One skilled in the art will appreciate that the interstitial web pages 464 and the welcome web pages 466 may be unique to the venue 440. Even though these web pages may be unique to the venue, the centralized web portal page server 458 within the JUMMMP Cloud 456 simplifies the overall system architecture within the venue 440 and within other venues by eliminating the need for a portal page server within each venue.

A local ad server 468 in the JUMMMP Cloud 456 may provide ads for the venue 440. As discussed above, the ads may be for the venue 440 itself or for the related businesses 442-446 (see FIG. 3). In addition, the ads may be for businesses near the venue 440 (or for other venues in the JUMMMP network). The centralized ad server 468 in the JUMMMP Cloud 456 simplifies the network architecture within the venue 440 and other venues by eliminating the need for an ad server within each venue.

A data base server 470 in the JUMMMP Cloud 456 may be configured to collect a broad range of information regarding the UEs 400 (including the user profile information stored in the memory 156 (see FIG. 2) of the UE that was provided when the UE was first identified in the venue. The profile information will help provide targeting marketing and advertising to the UE as it traverses the venue). As previously discussed, data messages may include geo-location data. The geo-location data (e.g., longitude and latitude)

can be obtained in several possible ways. In one embodiment, the wireless communication device (e.g., the UE 400 in FIG. 7) may have built-in GPS. Other possible location determination technologies include WiFi, 3G, approximation triangulation, or last-known location of the user. Other known location technologies may also be implemented in the system 100. For example, the UE 400 will communicate with different ones of the access point 448 in the venue 440 shown in FIG. 3. As the UE 400 moves throughout the venue, new communication links are established with nearby access points 448. By identifying which access point 448 the UE 400 is communicating with, it is possible to determine the location of the UE 400 with a reasonable degree of accuracy. The database server 470 is configured to store location information, along with time/date data to thereby track movements of the UE 400. In one embodiment, the database server 470 can also be configured to store message data from the UEs 400 throughout the system 100. In yet another embodiment, the database server 470 may also store user profiles for the UE 400 as well as profile data collected by the UE 400 from other JUMMMP users. In one configuration, the API, which is installed on the UE 400 as part of the verification process described above, is configured to generate the "heartbeat" signal that periodically reports location data back to the database server 470. The location data may include a time/date stamp to provide location information for the UE 400. This information can be useful for marketing purposes. Using the example of FIG. 3, where the casino venue 440 includes a large area as well as related businesses 442-446, the database server 470 can determine how long the UE 400 remains in a particular area (e.g., one area of the casino), how many times and how long the UE remains at the bar, in a nightclub or the like. By collecting this information, the database server 470 can establish a user profile for the UE 400 for marketing purposes.

The JUMMMP Cloud 456 also includes an IP transfer point 472, which is coupled to a mobile operator network 474 via a communication link 476. As those skilled in the art will appreciate, mobile data offloading, also called data offloading, involves the use of complementary network technologies for delivering data originally targeted for cellular networks, such as the mobile operator network 474. In areas where the cellular network traffic is heavy, network congestion may occur. To reduce congestion, mobile network operators sometimes set up WiFi access points in areas of congestion and allow some of the data originally targeted for the mobile operator network 474 to be carried by the WiFi network. Rules triggering the mobile offloading action can be set by an end user (i.e., the mobile subscriber) or the mobile network operator. The software code operating on the offloading rules can reside in the UE 400, in a server, or divided between these two devices. For the end users, the purpose of mobile data offloading may be based on the cost for data service and the ability of higher bandwidth. For mobile network operators, the main purpose for offloading is to reduce congestion of the cellular network. The primary complementary network technologies used for mobile data offloading are WiFi, femtocells, and integrated mobile broadcast.

In a typical embodiment, each mobile network operator has its own WiFi network to offload data that would otherwise be carried on its particular mobile operator network. In the context of FIG. 4, the APs 448 within the venue 440 do not belong to the operator of the mobile operator network 474 as is normally the case in data offloading. In the implementation described in the present disclosure, the data offloading is provided by the venue 440 through contract with the mobile operator network 474. Although FIG. 4 illustrates only a single mobile operator network 474, those skilled in the art will appreciate that it is representative of one or more mobile operator networks. In operation, each mobile operator network contracts with the venue 440, either directly or with the JUMMMP Cloud 456, to provide data offloading in the venue. When the UE 400 enters the venue, the mobile network operator is notified and the mobile operator network 474 can determine whether or not to offload data traffic for that UE. If data offloading for the UE is approved in accordance with the rules described above, Internet access, text messaging, and even telephone calls can be provided to the UE 400 via a connection from the mobile operator network 474 through the communication link 476 to the IP transfer point 472 within the JUMMMP Cloud 456. In turn, that offloaded data is routed through the backhaul 454 to an AP 448 and ultimately to the UE 440. Similarly, outgoing calls from the UE 400 may be routed in the reverse fashion. This approach has the beneficial effect of offloading traffic from an otherwise congested mobile operator network 474. In addition, the mobile network operator may find improved performance because direct communication with the UE 400 through the RAN (e.g., the RAN 406 in FIG. 1) may not work well when the UE 400 is inside a building, such as the venue 440. Thus, improved reception and reduction in network congestion are double benefits of the IP offloading provided by the JUMMMP Cloud 456.

The UE 400 must register with the system 100 at some initial point in time. The initial registration can be performed remotely using, by way of example, a personal computer connected to the JUMMMP Cloud 456 via the network 110. In another variation, the UE can perform an initial registration as it enters the venue 440 illustrated in FIG. 4, as described above. When the UE 400 initially contacts the AP 448, the policy controller server 458 will not have any data related to a particular UE 400. In this case, that initial AP 448 in the venue 440 may perform an initial registration. For the initial registration, the UE 400 can connect to the initial AP 448 and provide identification information. In an exemplary embodiment, the user can complete the initial registration process by providing data, such as the telephone ID (i.e., the phone number), a device ID, a user ID, and an email address as well as other information, such as the user profile data stored in the memory 156 (see FIG. 2) of the UE 400. The user ID may be a user generated name, nickname, or the like. The device ID may vary based on the particular type of the UE 400. For example, if the UE 400 utilizes an Android™ operating system, the device will be assigned an Android™ ID. In addition, the UE 400 may typically be assigned an international mobile equipment identification (IMEI). Any of these device identifications alone may be transmitted to the registration server 460. In another alternative embodiment, a unique hash of one or more device IDs may be generated and transmitted to the registration server 460 as the device ID. The short-range transceiver 176 (see FIG. 2) may also include an identification, such as a MAC address that is unique to the UE 400. The registration data described above can be provided to the registration server 460 along with the MAC address. The registration data may be stored in association with the MAC address. Once the initial registration process has been completed, subsequent authentications are greatly simplified. Once the initial registration process is completed, the web portal page server 458 may transmit other pages, such as the log-in web page 462, one or more interstitial web pages 464, and the welcome web page 466 shown in FIG. 4.

The UE 400 can also perform the initial registration using a conventional wireless service provider network. As previously discussed the UE 400 can communicate with the RAN 406 (see FIG. 1) via the wireless communication link 408 in a conventional manner. Those skilled in the art will appreciate that the UE can access the network 110 via the RAN 406. Conventional wireless service provider components, such as a gateway to the network 110 are known in the art, but not illustrated in FIG. 1 for the sake of clarity. In one embodiment, the UE 400 can perform a registration process with the registration server 460 via the RAN 406. In this embodiment, the UE 400 accesses a website that can be provided as part of the JUMMMP Cloud 456 illustrated in FIG. 4. In this example, the registration server 460 associated with the JUMMMP Cloud 456 of FIG. 4 can complete the initial registration process.

In one embodiment, a previously-registered UE 400 may come within range of the initial AP 448 in the venue 440 of FIG. 4 and establish a wireless communication link therewith. In establishing the communication link, the UE 400 transmits its MAC address and/or the phone ID or IMEI. The AP 448 transmits an authentication request message to the registration server 416 to determine whether the UE 400 is a registered device. Based on the MAC address, the registration server can confirm that the UE 400 has previously registered. Thus, the UE 400 is authenticated whenever it comes into range of an AP 448 of the system 100. This may occur transparently to the user. This automatic authentication process can occur even if the initial registration was in a completely different part of the country. Thus, the UE 400 may move from one venue 440 to another in the same city or region or may be in a completely different part of the country and be automatically identified and authenticated with APs that are part of the system 100 described herein. This convenient registration and authentication avoids the need for constantly searching for a WiFi connection as required by other systems. Based on this automatic authentication process, the UE 400 may be automatically connected to the WiFi network created by the APs 448 in the venue. The UE 400 may get welcome greetings from the venue and may also receive advertising, offers, discounts, and the like.

Figure 5:
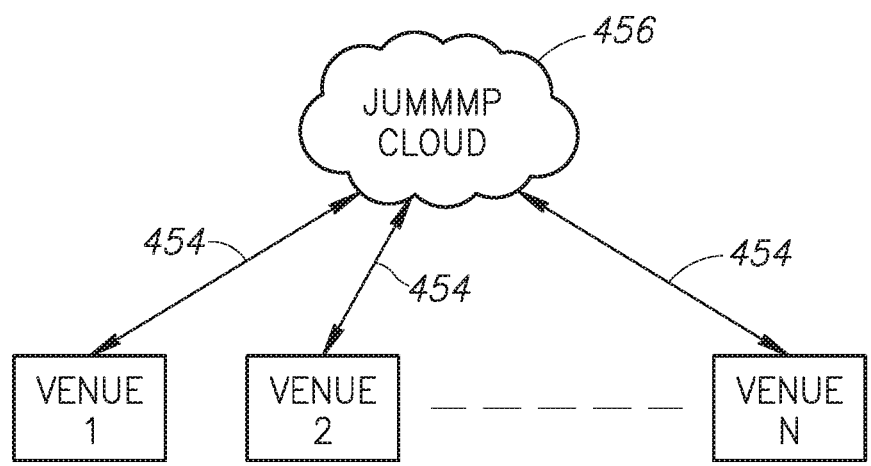
FIG. 5 illustrates the Cloud network of FIG. 4 communicating with multiple venues.

The registration process at a single venue has been discussed above with respect to FIG. 4. The JUMMMP Cloud 456 also advantageously provides a centralized registration function for multiple venues, as illustrated in FIG. 5. The multiple venues 440 are each connected to the JUMMMP Cloud 456 via individual respective backhauls 454. If a UE 400 initially registers at Venue 1, using the registration process described above, that registration information is stored in the JUMMMP Cloud 456. At a later point in time when the user enters, by way of example, Venue 2 illustrated in FIG. 5, the UE 400 will automatically identify the AP 448 and begin to communicate therewith. Because the UE 400 has already been registered, that information is passed along to the JUMMMP Cloud 456. This is true even if the various venues 440 are located far from one another. For example, an initial registration of the UE may take place at a sports venue in, by way of example, New York City. However, if the UE 400 is carried to a casino in, by way of example, Las Vegas, Nev., the UE 400 will automatically begin to communicate with the AP 448 in the new venue in Las Vegas. Because each venue is coupled to the JUMMMP Cloud 456, the UE 400 need not undergo another registration process when it enters the venue 440 in Las Vegas. Thus, a single registration process at any venue is sufficient for registration with the JUMMMP Cloud 456. Whenever the UE 400 goes into a different venue 440 that is coupled to the JUMMMP Cloud 456, the UE 400 is automatically recognized and authenticated. During the automatic authentication process, the JUMMMP Cloud 456 may provide interstitial portal pages 464 to the UE 400. Upon completion of the automatic registration process, welcome portal pages 466 may then be transmitted to the UE 400.

Figure 6:
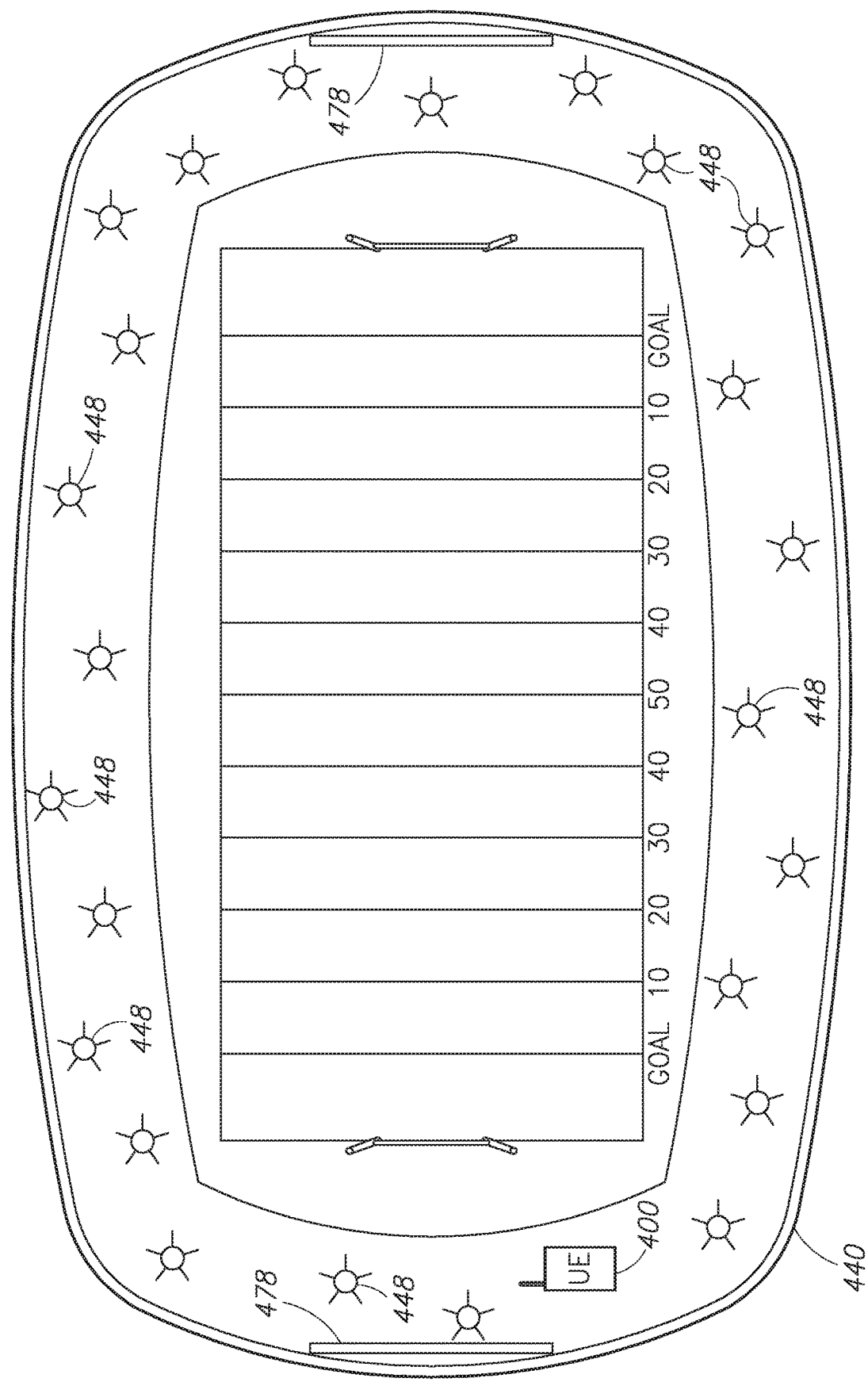
FIG. 6 illustrates a large array of wireless access points distributed throughout a sports venue.

In another example of a business-related implementation, the venue 440 may be a football stadium, as illustrated in FIG. 6, or some other sports venue. In this embodiment, the APs 448 are distributed throughout the structure of the sports venue. The UE 400 communicates with one or more of the APs 448 in the manner described above. The UE 400 can perform an initial registration process or an automatic re-registration process, as described above. The APs 448 maintain virtually continuous contact with the UE 400 while it is within the sports venue 440. As discussed with respect to FIG. 4, the APs 448 are coupled to the gateway 450 to allow the JUMMMP Cloud 456 to disseminate information to the UE 400 in the manner described above. The disseminated information may be in the form of advertisements from vendors within the venue 440. For example, the UE 400 can communicate with the JUMMMP Cloud 456 via one or more AP 448 to retrieve a map of the stadium, to order food for pick-up at a designated spot or to order food for delivery directly to the user's seat in the stadium. The bi-directional communication capability between the UE 400 and the APs 448 permits audience participation with the venue 440. Ordering food for delivery to the user's seat is a limited level of audience participation. However, as described in greater detail below, the communication links formed between multiple UEs and multiple APs in the venue 400 permits a much greater degree of audience participation. Other information from the local ad server 468 in the JUMMMP Cloud 456 may provide discount coupons to the stadium sports clothing vendor to use during or following the game.

The JUMMMP Cloud 456 may also provide streaming video to the UE 400. For example, if the sports venue in FIG. 6 is a football stadium, the JUMMMP Cloud 456 may provide streaming video highlights or even complete games from a different football stadium that is also coupled to the JUMMMP Cloud 456. While some stadiums provide selected replays on a large screen TV or other display 478 for fans, such displays are not available if the user is away from the field to get a drink, go to the bathroom, etc. However, with the system described herein, the instant replay may be provided directly to the UE 400 at virtually any location throughout the sports venue 440. In this embodiment, the instant replay may be multicast to all UEs within the sports venue 440 by the multitude of APs 448.

In another embodiment, the UE 400 may be request instant replay video from the JUMMMP Cloud 456. In this example, a customized replay video may be provided specifically to the UE 400 rather than a multicast to all UEs within the sports venue 440. The request for customized video may be related to the sports venue 440 in which the UE is presently located or may be a request for replay video or streaming video from a different sports venue.

In the example of FIG. 6, the data delivered from the local ad server 468 (see FIG. 7) to the UE 400 may be related to the specific venue 440, such as advertisements for related businesses (not shown). In other examples, the data provided to the UE 400, such as instant replay video data, is directly related to the sporting event itself. In both cases, the data provided to the UE 400, or received from the UE 400 relates to the particular venue 440. Alternatively, the local ad server 468 may provide advertising to unrelated businesses, such as a coupon for a nearby restaurant that can be used following the sporting event.

In one embodiment, the instant replay for the venue 440 (see FIG. 4) may be provided by the JUMMMP Cloud 456 in the manner described above. In yet another embodiment, the local server 432 (see FIG. 1) within the venue 440 may provide some services, such as the streaming media or instant reply for activities within that local sports stadium.

The authentication process for the UE 400 has already been described in detail above. In one aspect of the initial registration, the user can provide credit card or other financial information. In the example of the casino venue 440 in FIG. 3, the user may provide credit card information for a hotel room in the casino, upgrades, such as a bandwidth upgrade, performance tickets, or the like. In one embodiment, the financial information may be stored in an encrypted or protected form on the JUMMMP Cloud 456. At a subsequent time, such as when the user enters the sports venue 440 in FIG. 6, the automatic authentication process described above will occur in a manner transparent to the user. In an alternative embodiment, the UE may order food and drink to be delivered directly to the user's seat within the sports venue. In this aspect, the UE 400 communicates with one of the APs 448 to select a food ordering menu from the welcome web pages 466. The credit card associated with the UE 400 may be charged for the food, which may be delivered directly to the user's seat in the sports venue.

Figure 7:
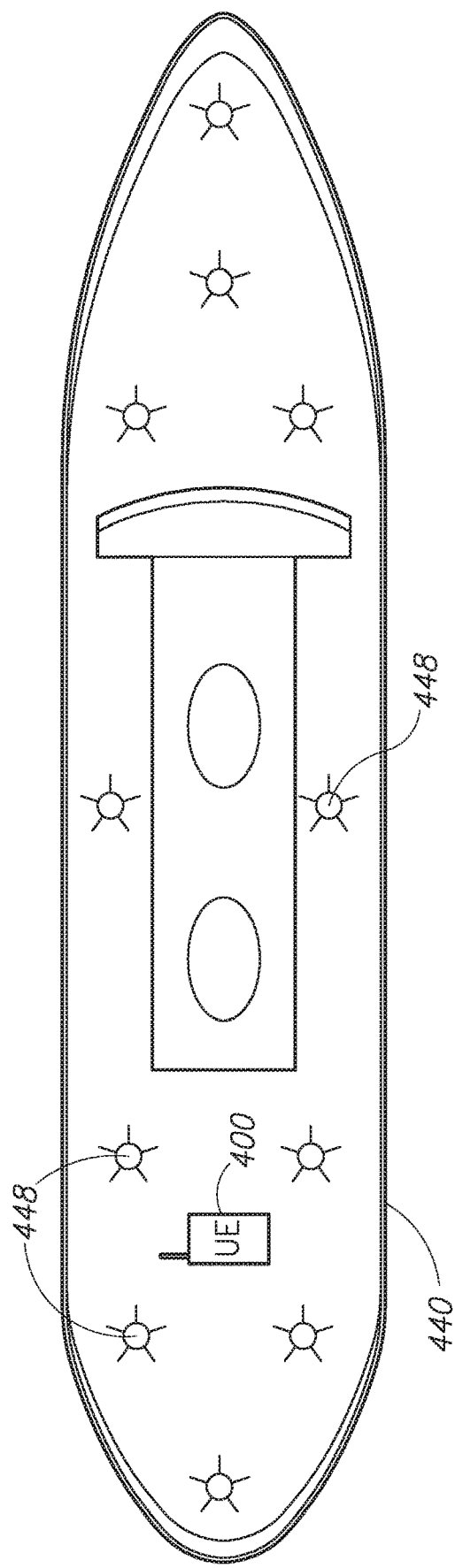
FIG. 7 illustrate an array of wireless access points throughout a cruise ship venue.

In the examples of FIGS. 4 and 7, the venue 440 is a fixed location, such as a casino venue in FIG. 3 and the sports venue in FIG. 6. FIG. 7 illustrates a cruise ship venue 440 in which the entire venue is mobile. As illustrated in FIG. 7, a number of APs 448 are distributed throughout the ship. Although FIG. 7 illustrates only a top view of a single deck, those skilled in the art will appreciate that a plurality of the APs 448 are distributed throughout the ship at various deck levels to provide complete coverage throughout the cruise ship venue 440. In this example, the UE 400 will register with one of the APs 448 as soon as the user comes within range of the cruise ship venue 440. As discussed above, if UE 400 has been previously registered with the JUMMMP Cloud 456 (see FIG. 4), the automatic authentication process will occur in a manner transparent to the user. Thus, the UE 400 is automatically authenticated as soon as the user boards the cruise ship venue 440. The on-board vendors can be authenticated vendors and data (ads, coupons, etc.) can be delivered in the manner described above with respect to other venues. In addition, authenticated vendors at ports-of-call can provide data to the authenticated UE 400. In this manner a passenger can receive coupons or other data, such as on-shore activity information, to provide a more enjoyable cruise experience to the passenger.

The UE 400 maintains complete contact with the WiFi network provided by the plurality of APs 448 so long as the UE is on the cruise ship. If the user participates in an on-shore activity, the UE 400 will be automatically re-authenticated when the user returns to the cruise ship venue 440. In this embodiment, the gateway 450 (see FIG. 4) on the cruise ship may communicate with the JUMMMP Cloud 456 via a satellite link (not shown) or other radio communication link well known in the art.

Figure 8:
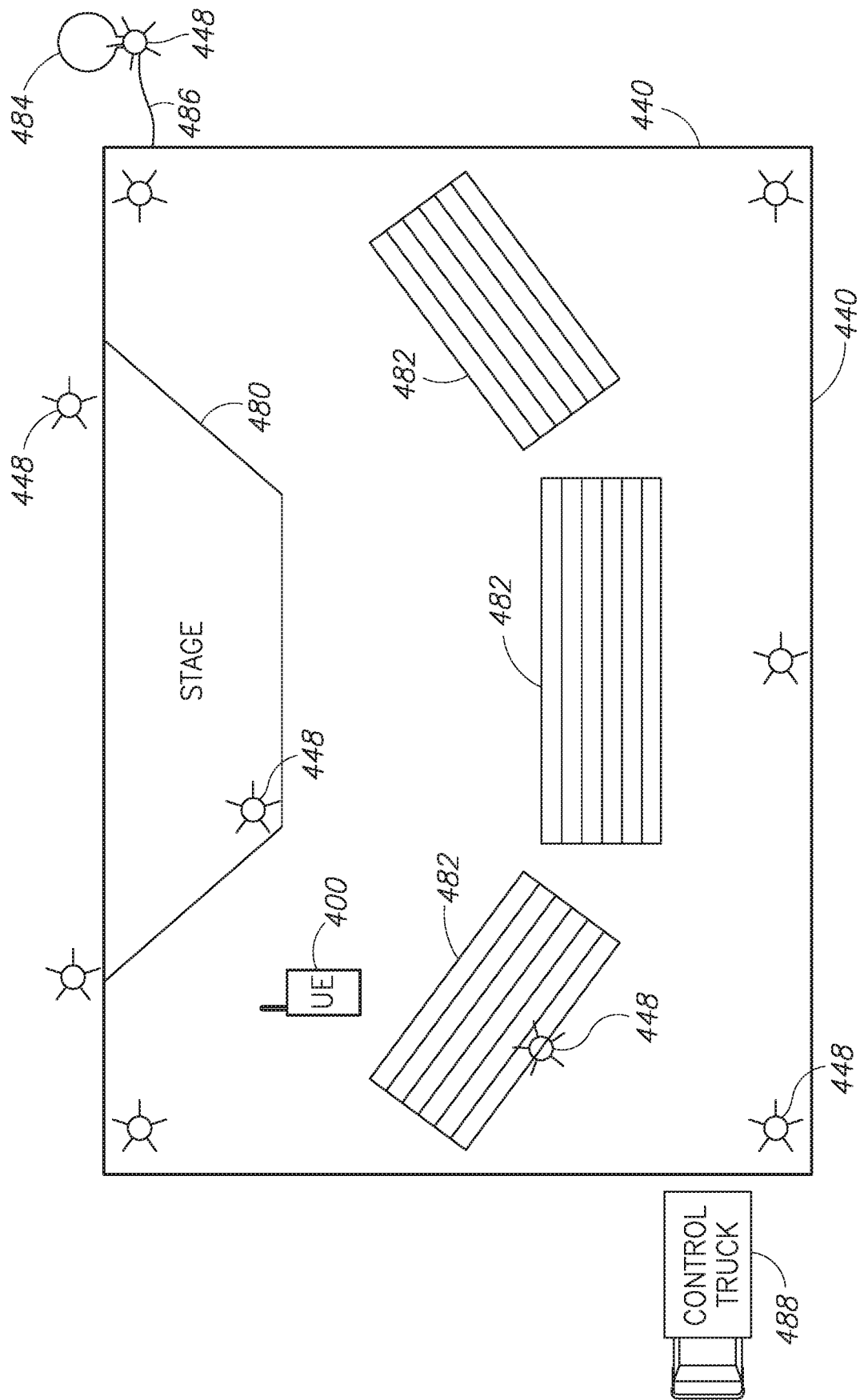
FIG. 8 illustrates an array of wireless access points distributed throughout a concert venue.

In the examples provided above, the APs 448 are in fixed locations throughout the venue 440 to maximize coverage throughout the venue. This is true whether the venue 440 is a fixed facility, such as the casino venue or sports venue or whether the venue is in motion, such as the cruise ship venue. However, the system described herein is flexible enough to provide temporary coverage in a venue that does not have preexisting coverage. For example, a concert hall may not have existing coverage through a network of APs as described above. For example, a concert venue at the state fair may be temporary in nature. Similarly, a concert venue may be constructed temporarily at an open air location (e.g. Woodstock or a speedway). In yet another example, some venues, such as a racetrack that is constructed temporarily, may not have an existing infrastructure of APs 448. In yet another example embodiment, the system described herein can provide a temporary mobile venue infrastructure, which may be referred to herein as "WiFi on Wheels" (WoW). An example of a WoW implementation is illustrated in FIG. 8. The example of FIG. 8 is a temporary concert venue, such as may be common at a state fair or other location. A stage 480 and grandstands 482 may be positioned within the venue. The location of the APs 448 throughout the venue 440 may be dependent on the location of the stage 480 and the grandstands 482 to provide the necessary coverage. In this embodiment, the APs 448 may be mounted on existing infrastructure, such as telephone poles, light poles, and the like. The APs may also be mounted directly to the stage 480 or the grandstand 482. A control truck 488 or other mobile vehicle may contain the additional infrastructure for the temporary concert venue 440. For example, the control truck 488 may contain the router switches gateway 450 (see FIG. 4) to provide the necessary connection to the JUMMMP Cloud 456. The control truck 488 may also include a satellite link to implement the backhaul 454. The backhaul 454 can also be implemented as a microwave link from the control truck 488 or a hardwired connection if available. Thus, the WoW implementation of FIG. 8 can be set up and removed in a relatively short period of time.

In operation, the temporary concert venue 440 operates in the same manner described above with respect to other venues. That is, the UE 400 is automatically authenticated if the UE 400 has previously been authenticated with the JUMMMP Cloud 456. If the UE 400 has never been registered with the JUMMMP Cloud 456, the UE undergoes an initial registration process described above with respect to FIG. 4. Thus, the temporary concert venue 440 operates in a functionally identical manner to the fixed venues described above.

One way to enhance a user experience in a venue is to provide opportunities for greater audience participation within the venue. Although examples may be provided for specific venues, those skilled in the art will appreciate that these examples, or other similar examples, are applicable to many different venues including, but not limited to, a shopping mall, theater, concert, sports stadium, casino, cruise ships, and the like.

One readily implemented form of audience participation is game play within a particular venue. In one aspect, the venue can control game play with a large number of UEs and provide points to winners that may be redeemable in the forms of goods or services at the venue. In another aspect, the points may be accumulated and stored in a user account on the database server 470 (see FIG. 4) in the JUMMMP Cloud 456. Points that are centrally stored may be redeemed at different participating venues. In this embodiment, the accumulated points from one venue are stored in the database server 470 in association with the user ID. When redeeming the accumulated points at the same or a different venue, the UE recalls the accumulated points data from the database server 470 for redemption at the selected venue.

The game play activities can include single player games where one individual operates his UE in cooperation with the venue 440. In addition, there may be phone-to-phone games between two people. In yet another alternative, the game can be a multi-player game played on multiple UEs.

An example of a single player game may be a trivia game where the user answers questions transmitted to the UE by an AP 448 within the venue 440. For example, the user can arrive at a sports stadium venue 440 (e.g., see FIG. 6) prior to the start of the sporting event. While awaiting the start of the event, the user can answer trivia questions about his home team, visiting team, the particular sport being viewed, general sports questions, questions about current events, pop culture, or the like. If the game play available prior to the start of the sporting event is interesting, the user may be encouraged to arrive at the sports venue earlier than normal to participate in the game play events. The sports venue may benefit by increasing its sales of food, beverages, sports clothing, souvenirs, and the like.

The trivia game described above can easily be extended to all attendees even though the participants are communicating separately via their individual UEs. In one example, trivia questions can be displayed on the display 154 (see FIG. 2) of the UE 400 or displayed on the large display screen 478 (see FIG. 6) at the venue itself. In one example, the question is displayed on the large display screen 478 at the venue and the possible answers are displayed on the display 154 of the UE 400 for selection by the user. Answers are transmitted to the APs 448 and can be evaluated by a local server (e.g. the server 432 in FIG. 1) or by the database server 470 (see FIG. 4) in the JUMMMP Cloud 456. The local server 432 or database server 470 records and grades the answers to determine winners. If a user answers correctly, they receive points. For example, a trivia game may comprise ten questions. In one example, all participants can receive points for correct answers out of the ten trivia questions. In addition, top scoring individuals can win an additional prize, such as a gift coupon to be redeemed at the venue or redeemed at a nearby venue, such as a restaurant. If there are multiple winning entrants, the local server 432 or the database server 470 can randomly select one winner from amongst the winning participants.

In another example of multiple participants, the large stadium display 478 can include animated games that can be viewed by all spectators. For example, a popular stadium game includes three cups where a ball is placed under one cup. The cups are shuffled around for several seconds and participants are then asked to select the cup under which they think the ball will be found. In an updated implementation of this game, the display 154 of the UE 400 could display the options (e.g., cup A, cup B, and cup C) and allow the users to make their choice. The answers are transmitted to the APs 448 and can be evaluated by the local server 432 or the database server 470 and points awarded in the manner described above. Other types of animated race games (e.g., car race, horse race, boat race, and the like) can be similarly displayed on a large screen in the venue where the participants make their selections using their UEs. As described above, winning selections will score points.

In yet another example of an audience participation game, there can be a virtual beach ball that moves from one AP 448 to another AP. All of the UEs 400 connected to the first AP 448 have a beach ball that appears on the display 154 (see FIG. 2). As the beach ball appears on the display 154 of one UE, the user may tap, slide, or otherwise manipulate the image, or move the entire UE, to cause the beach ball to move off of the display of the UEs connected to the first AP and onto the display of a different group of UEs 400 connected to another AP 448. The beach ball may "bounce" from one AP 448 to another as it gets hit from device to device as real beach balls are often bounced around in a concert. The beach ball could go randomly from one AP 448 to another or may move in accordance with the motions of the user of the UE 400 on which the beach ball appears.

Other audience participation games can include user control of activities that are displayed on the large screen 478 in the venue so that non-participants can view the action. For example, users could sign up for an animated auto race game that will be projected on the large stadium display 478 in the venue. The sports venue can randomly select from among the plurality of attendees that have signed up for the activity and conduct preliminary races and final races. Using the race car example, a preliminary race may have five participants. The user can manipulate their UE 400 to provide appropriate control (i.e. acceleration, braking, and steering) with the results of that control being shown on the large screen 478 so that everyone can watch the race. In a preliminary race, the five contestants race around the track and the winner can advance to a subsequent round. Those skilled in the art can appreciate that this type of activity can take place during a lull in the sporting activity, such as a timeout at a football game, basketball game, or the like. With each successive round of preliminary races, the winner is chosen to move on to a final round. For example, five preliminary rounds could each have five racers with the winner of each round moving to the finals. After all finalists are selected, an additional race is run to select the overall champion. Those who participate at all may get some points, winners of the preliminary rounds get additional points, and the overall winner may receive even more points. The goal of all this activity is to increase audience participation and activity at the selected venue. If there is sufficient interest generated at the venue, the audience will arrive earlier, be more active, and stay longer. This may allow the venue to generate increased revenue through advertising and through increased and lengthened attendance.

In a variation of the race game described above, other audience members can "bet" on a winner in the preliminary rounds and/or the final round. Those selecting the correct winner can receive additional points. Thus, even though an audience member is not actively participating in a game, they may still participate by making their selection for the winner.

Although the race game described above involved individuals, it is possible to extend this concept to team activities as well. Multiple audience members may sign up in advance to form a team to play a team game on the large display screen at the venue. For example, audience members at a hockey game can form their own teams and play team video hockey against other teams in the sports venue. As with the race car example provided above, hockey games can be short in nature with winners advancing to further rounds. Again, non-playing audience members can participate by selecting the winning player or winning team and receive points for their correct choices.

In another example of audience participation, the large stadium display 478 at a venue may be used to display audience preferences, such as a favorite team, favorite player on the team, and the like. Voting statistics can be shown on the stadium display 478 and/or on the display 154 (see FIG. 2) of the UE.

Another example of audience participation, the words for a sing-a-long can be displayed on the display 154 of the UE 400 to allow audience members to sing along. In a concert venue, the words may be the words of a song being presently performed. The concert venue can also give away songs for free that can be downloaded via an AP 448 or a password may be provided to the UE to provide download authorization at a later time. Thus, the form of audience interaction may be varied from one venue to another.

In yet another example, of audience participation, a cruise ship venue (see FIG. 7) may run a treasure hunt where the participants collect clues using their UEs. For example, participants can receive a first clue and must use the clue to find their way to a particular location in the cruise ship to receive another clue. In this example, the clue may only be provided by a single one or small group of the APs 448. Unless the participant correctly interprets the first clue and moves to a location in proximity with the selected AP 448, they will not receive the second clue. In turn, the second clue may lead a participant to another part of the cruise ship where they will come into contact with yet another one of the plurality of APs 448 distributed throughout the ship. Once they are in proximity with that AP, they will receive an additional clue. Participants may have to answer questions or make selections using their UE 400 to receive the next clue from the AP 448. Participants can receive points for getting some clues and the winner can receive additional points or other prizes. While such an audience participation game is not well-suited to a concert or sports venue (you don't want the entire audience running around the venue), it may be well-suited for other venues, such as the cruise ship, or a casino. In another embodiment, participants may form teams and participate in a game that requires individual team members to go to different locations within the cruise ship to receive a clue or a portion of the clue. After receiving their clues, the team members must put together the pieces and determine the appropriate course of action. Thus, the games may be varied to permit individual participation or to encourage larger group participation activities.

Those skilled in the art will appreciate that the treasure hunt example presented herein can be extended beyond a single venue. For example, a treasure hunt could be expanded to an entire neighborhood or city where the participants receive a clue from one AP 448 via the participant's UE 400. Correct interpretation of the clue will lead the participant to an area where they within the coverage of a different AP 448 where the UE 400 will receive another clue. The participant may have to answer a question or make a selection using their UE 400 to receive the next clue from the AP 448. Correct interpretation of all the clues will lead participants to the "treasure." Winners can receive prizes or points as described above.

In the example of a casino, you may want users to move throughout the casino venue by following certain clues. In doing so, the participants are also effectively exploring the casino and may return to certain portions of the casino upon completion of the game or may decide to simply stop the game and stay at their present location. Again, the overall goal is to increase the user experience by encouraging audience participation within the venue. The games also include an advertising component and promotions for future events at the venue.

Figure 9:
FIG. 9 illustrates a group of user equipment devices receiving images controlled by a venue.

In yet another form of audience participation, the venue 440 may transmit image data to one or more UEs. For example, it is possible to effectively "project" an image, advertising, video data, multimedia data, and the like onto one or more UEs in the venue by transmitting the data to one or more UEs. FIG. 9 illustrates a number of UEs that have all, for the sake of convenience, been given the reference number 400. In this embodiment, each UE 400 may receive a static ad or video. The same data is sent to all UEs from all of the APs 448 in the venue 440 (see FIG. 3 and FIGS. 6-8). In this manner, every UE that is authenticated by the system 100 will receive the same ad. The ad may be sent as a Public Message so that any UE 400 within range of an AP 448 within the venue 440 will receive the message. Alternatively, each UE may be designated as a group member when the UE is initially authenticated at the venue 440. In this manner, the ad would be sent as a Group Message and directed only to those UEs that had been authenticated as members of the group. This would prevent the ad from being disseminated to other UEs that may come within proximity of the UE 400 and avoid the ad being disseminated through message synchronization, as described above.

In yet another alternative embodiment, the UEs 400 shown in FIG. 9 may receive a live video feed from the venue 440. For example, in the concert venue of FIG. 8, there may be video cameras positioned at one or more locations around the stage 480. Members of the audience that have an authenticated UE 400 can receive one or more of the video feeds shown directly on the display 154 (see FIG. 2) of the UE. In an exemplary embodiment, either the venue 440 or the JUMMMP Cloud 456 provides a video feed to all of the APs 448 within a venue or to selected APs within the venue. The UE 400 receives the video from the AP 448 to which it is connected.

Figure 10:
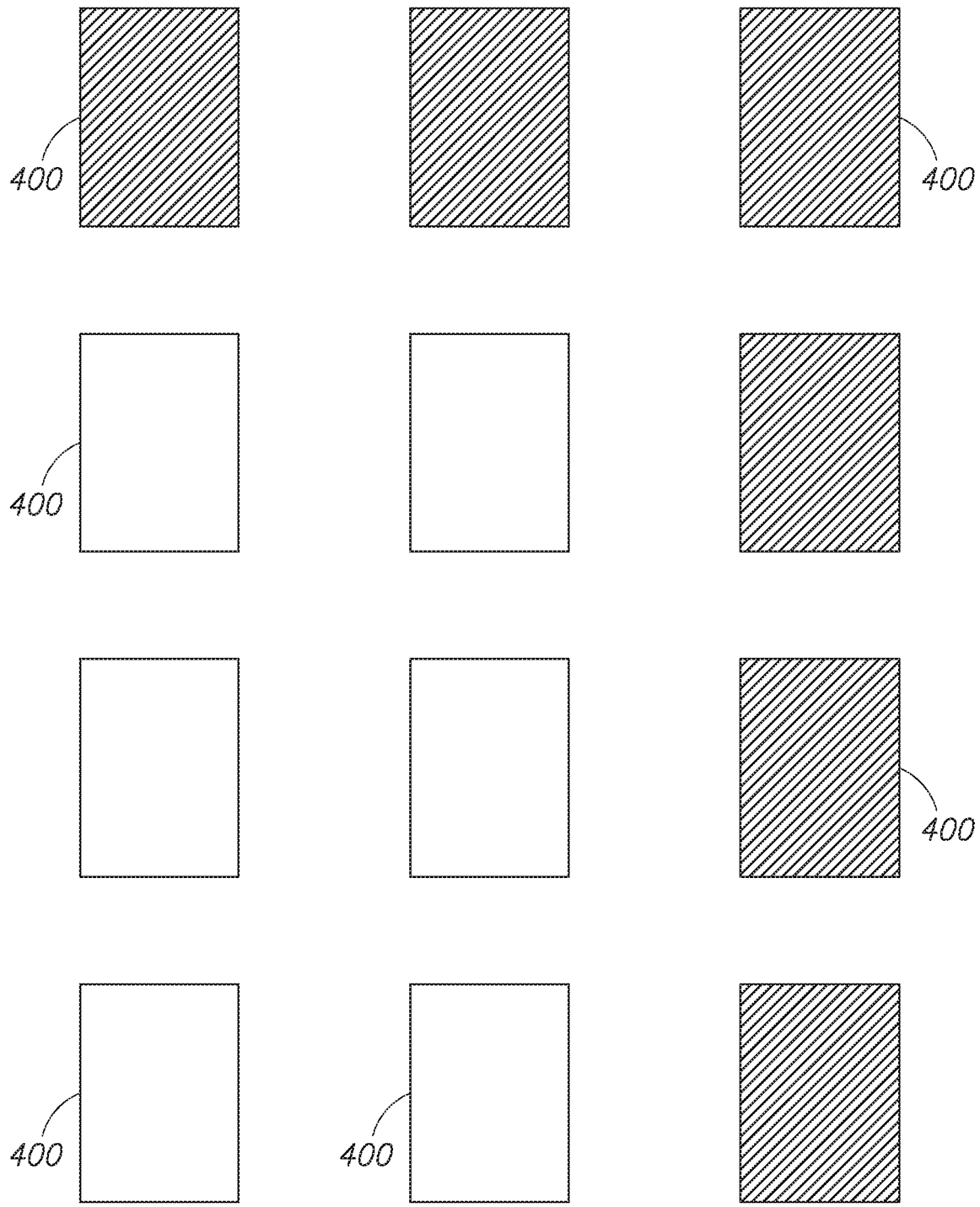
FIG. 10 illustrates an array of user equipment devices receiving portions of image data that collectively form a large display.

In another alternative embodiment, the venue can send a portion of an image, video signal, or the like to each UE 400 such that a collection of the UEs 400 effectively combine the image data in the form of digital signage. In this embodiment, a static image, video, or the like is essentially pixelated such that each UE is essentially a pixel in an overall image. By holding up the UEs, the entire image may be viewed. For example, FIG. 10 shows an array of the UEs 400 where selected UEs have been blackened out to form the numeral 7. Although FIG. 10 illustrates only simple images formed by a few UEs 400, those skilled in the art will appreciate that a large number of UEs can be programmed to produce complex images, such as team logos, videos, and the like.

The image of FIG. 10 is a simple black and white image. However, the venue 440 can easily transmit color pixel information to a large number of UEs 400 to form complex color images as well. In the example of FIG. 10, the colors of the blackened UEs 400 could have one team color while the whitened UEs 400 could have a second team color or selected background color. In the example of FIG. 10, the UEs 400 may form a numeric display that counts down from 7, as shown in FIG. 10, to zero and then project some other selected design.

In this embodiment, each UE forms a pixel in a larger display that can include cue cards, photos, or the like to collectively display an image. As noted above, the image may be a static image, video, or a static design or design in motion, such as an advertisement.

To properly display a large image using individual UEs as pixels, it will be important to know the precise location of each UE within the venue. For example, in the sports venue 440 of FIG. 6, each individual has a ticket with an assigned seat. Upon authentication of the UE 400, the user can provide the seat number or scan a QR code that includes the seat information so that the precise location of each UE 400 is known. Those skilled in the art will appreciate that other techniques can be used to determine the precise location of UEs 400 within the venue 440. For example, GPS data may be available on some or all of the UEs 400. Information contained within the heartbeat signal, described above, can be used to provide accurate location information for each UE 400. In addition, the system can determine the location of the UEs 400 based on signal strength measurements from various APs 448 throughout the venue 440.

In another example embodiment, the multiple UEs 400 can be used to create a light show. For example, an exploding firework can be displayed on an array of UEs 400 by programming individual ones of the UEs to change colors at the appropriate moment in time. The exploding fireworks can be accompanied by music transmitted to the individual UEs or played through a venue sound system.

In yet another example, the UEs 400 can be used to synchronize other audience activity in the venue 440. For example, in the sports stadium venue 440 in FIG. 6, it is common to have fans stand up and sit down as a "wave" moves around the stadium. In this example, the APs 448 can be programmed to signal the individual fans when to stand up and when to sit down. For example, the UEs 440 connected to selected APs 448 can be programmed to have a white display screen for a particular AP at a particular time. The white display screen data "moves" from one set of selected APs to another such that the EUs connected to those APs will receive data to turn the display white. As the white screens "move" from one AP to another, the venue effectively performs a wave. Similarly, the array of UEs 400 can be used to form a bar in the stadium that extends from near the field to the top of the stands. The fans can stand up as the bar rotates around the stadium. In yet another alternative embodiment, the array of UEs throughout the stadium may be programmed with a visual image of a wave that travels around the stadium in a virtual manner.

In yet another embodiment, the UE 400 could instruct one part of the stadium, such as an end zone portion, to stand when the UEs receive instructions to stand, to shout, to sit, and the like. In this manner, the UEs can have different sections of a stadium standing or sitting or cheering in accordance with instructions in a manner that is controlled by instructions received by the individual ones of the UEs 400.

The audience participation can also be extended to advertising. In the example of FIG. 9, a static image is sent to all UEs 400 within the venue 440. However, the advertising can also be more directed. For example, an AP near a food court in a venue can send ads for businesses within the food court to UEs that are in communication with an AP near the food court. Alternatively, UEs clustered within range of a particular AP may receive one image while another cluster of UEs near the same AP may receive a different image. In yet another alternative, the advertising can be targeted to an individual UE 400 at a single AP 448 based on the heartbeat information and the user profile information contained in the database server 470 (see FIG. 4).

UEs can also be grouped together to form a light show. For example, music may be played through the individual UEs or through the venue sound system. Data can be sent to individual UEs, clusters of UEs, and/or an array of UEs to form a pixelated image, or to all UEs within the venue such that the image on the UEs changes in synchrony with the music. Each AP can send information to control the flashing of mobile devices at that particular AP using different flash rates, different colors, images, and the like.

In an example described above, video data was distributed to various APs and downloaded to the UEs in a venue. However, the API in the UE 400 is configured to pull content from a server or to receive content pushed from a server. In order to minimize traffic associated with all mobile devices connected to a server simultaneously to get content, it is possible for a selected few UEs to connect to the server to get content. In turn, the selected UEs can communicate with other nearby UEs in a peer-to-peer mode to distribute the content to other mobile devices. As described above, the UEs can be configured to synchronize messages, which may be in the form of text, image data, audio, video, multimedia data, or the like. In this embodiment, an AP 448 can function as the hot spot in order to help disseminate information amongst the UEs. This reduces the overall number of UEs that are required to be connected to the server simultaneously to receive pushed content.

In another alternative embodiment, it is possible to preload video data onto a UE prior to entering the venue, or upon entering the venue, but before the video will be displayed. For example, prior to a concert, a UE can download a pre-determined set of videos. During the concert, commands can be sent to play the canned videos that are resident on the UE. This may be done on a venue-wide basis, or separately for each AP or group of APs. In an alternative embodiment, videos can be preloaded into a UE as soon as the UE is authenticated at the venue 440. In this implementation, the videos are automatically and transparently (to the user) downloaded via the APs prior to being used. In operation, the APs can send commands to play the recently downloaded videos.

As discussed above, the UEs can be configured to synchronize messages. In an embodiment where video data is downloaded upon arrival and authentication at the venue 440, the first UEs to receive the data may subsequently synchronize with other UEs that arrive later so that all UEs contain the video data prior to the concert start time.

In yet another alternative embodiment, audience participation can take the form of the audience providing images to assist in the creation of a picture wall or blanket. At an event, individual UEs having the imaging device 180 (see FIG. 2) can take photos and submit them, via the APs 448 to a centralized server (e.g., the local server 432 in FIG. 1 or the database server 470 in FIG. 4). The individual images submitted by the various UEs can be assembled into a photo montage that can be transmitted to each of the UEs for portrayal on the display 154 (see FIG. 2) or for display on the large stadium screen 478 (see FIG. 6). The concert performer can also take photographs onstage and send the images to all UEs 400 via the APs 448.

Thus, the communication systems described herein are intended to enhance audience participation at a venue through direct involvement of the audience. The involvement may take the form of game play, digital signage, advertising, photo collages, or the like. The bi-directional communication capability described herein enhances the audience experience.

The foregoing described embodiments depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

Accordingly, the invention is not limited except as by the appended claims.

The invention claimed is:

1. A method for audience participation using user equipment (UE) wireless communication devices in a geographic area configured with a plurality of wireless access points (APs) comprising:
   upon detection of any one of the plurality of APs, each of the plurality of UEs performing an automatic authentication with the AP whose signal was detected by the respective UE;
   upon completion of the automatic authentication, a server transmitting a plurality of welcome portal pages to the plurality of UEs;
   each of the plurality of UEs responding to user input to select and display merchandise order information from among the received plurality of welcome portal pages;
   any of the plurality of APs receiving merchandise order request data, based at least in part on the displayed merchandise order information, from a first of the plurality of UEs placing a merchandise order;
   the server receiving the merchandise order and using a heartbeat signal automatically transmitted from the UE to at least one of the plurality of APs to electronically and automatically determine a location of the first of the plurality of UEs within the geographic area; and
   the server performing an order fulfillment operation based on the received merchandise order request data to enable delivery of merchandise ordered by the first of the plurality of UEs to the electronically determined location of the first of the plurality of UEs irrespective of which of the plurality of APs received the merchandise order request data.

2. The method of claim 1 wherein the merchandise order information transmitted to each of the plurality of UEs is based on the location of individual ones of the plurality of UEs within the geographic area.

3. The method of claim 1 wherein the order fulfillment operation comprises designating an order pick-up location within the geographic area where ordered merchandise is available for pick-up by a user of the first of the plurality of UEs from which merchandise order request data has been received.

4. The method of claim 1 wherein determining the location of the first of the plurality of UEs is performed by receiving location data from the first of the plurality of UEs.

5. The method of claim 1 wherein determining the location of the first of the plurality of UEs is performed by determining a proximity of the first of the plurality of UEs to one of the plurality of APs.

6. The method of claim 1 wherein the geographic area is a venue with seats and determining the location of the first of the plurality of UEs comprises using the at least one of the plurality of APs to determine a seat location of the first of the plurality of UEs from which merchandise order request data has been received and performing the order fulfillment operation comprises delivering the ordered merchandise to the determined seat location of the first of the plurality of UEs from which merchandise order request data has been received.

7. The method of claim 6 wherein determining the seat location of the first of the plurality of UEs comprises the first of the plurality of UEs transmitting the seat location to the server for processing to thereby determine the location in the venue for the first of the plurality of UEs.

8. The method of claim 1 wherein merchandise comprises food or beverages.

9. The method of claim 1 wherein the heartbeat signal contains location information derived from other than a Global Positioning System.

10. A method for audience participation using user equipment (UE) wireless communication devices in a geographic area configured with a plurality of wireless access points (APs) comprising:
   upon detection of any one of the plurality of APs, each of the plurality of UEs performing an automatic authentication with the AP whose signal was detected by the respective UE;
   upon completion of the automatic authentication, a server transmitting a plurality of welcome portal pages, including merchandise coupon information, to the plurality of UEs;
   each of the plurality of UEs responding to user input to select and display the merchandise coupon information from among the received plurality of welcome portal pages;
   any of the plurality of APs receiving merchandise order request data, based at least in part on the displayed merchandise coupon information, from a first of the plurality of UEs;
   the server receiving the merchandise order and using a heartbeat signal automatically transmitted from the UE to at least at least one of the plurality of APs to electronically and automatically determine a location of the first of the plurality of UEs within the geographic area; and the server performing an order fulfillment operation based on the received merchandise order request data to enable delivery of merchandise to the electronically determined location of the first of the plurality of UEs irrespective of which of the plurality of APs received the merchandise order request data.

11. The method of claim 10 wherein merchandise comprises clothing.

12. The method of claim 10 wherein the heartbeat signal contains location information derived from other than a Global Positioning System.

13. A system to permit audience participation in a geographic area using user equipment (UE) wireless communication devices comprising:

a plurality of wireless access points (APs) each having an area of radio coverage, each of the plurality of APs being configured to communicate with any of a plurality of UEs within the area of radio coverage of the respective APs;

each one of the plurality of UEs performing an automatic authentication upon initially moving into the area of radio coverage of any one of the plurality of APs;

a server communicatively coupled to the plurality of APs and configured to provide merchandise order information to the plurality of APs for transmission to the plurality of UEs within the area of radio coverage of the respective APs upon completion of the automatic authentication;

the server being further configured to receive merchandise order request data transmitted by a first of the plurality of UEs and received by any of the plurality of APs;

after receipt of the merchandise order, the server being further configured to use information using a heartbeat signal automatically transmitted from the UE to at least one of the plurality of APs to electronically and automatically determine location data for the first of the plurality of UEs from which merchandise order request data has been received; and the server being further configured to process the merchandise order request data and location data to thereby enable an order fulfillment operation based on the received merchandise order request data to deliver merchandise to the electronically determined location of the first of the plurality of UEs from which merchandise order request data was received in response to receipt of the merchandise order information irrespective of which of the plurality of APs received the merchandise order request data.

14. The system of claim 13 wherein the order fulfillment operation comprises the server designating an order pick-up location within the geographic area where ordered merchandise is available for pick-up by the user of the first of the plurality of UEs from which merchandise order request data has been received.

15. The system of claim 13 wherein the server being configured to determine the location data for the first of the plurality of UEs comprises the server receiving location data from the first of the plurality of UEs.

16. The system of claim 13 wherein the server being configured to determine the location data for the first of the plurality of UEs comprises the server determining a proximity of the first of the plurality of UEs to one of the plurality of APs.

17. The system of claim 13 wherein the geographic area is a venue with seats and wherein the server being configured to determine the location data for the first of the plurality of UEs comprises using the information associated with the at least one of the plurality of APs to determine a seat location of the user of the first of the plurality of UEs from which merchandise order request data has been received and enabling an order fulfillment operation comprises delivering the ordered merchandise to the determined seat location of the user of the first of plurality of UEs from which merchandise order request data has been received.

18. The system of claim 17 wherein the server being configured to determine the seat location of the first of the plurality of UEs comprises the first of the plurality of UEs transmitting the seat location to the server for processing to thereby permit the server to determine the location in the venue for the first of the plurality of UEs.

19. The system of claim 13 wherein merchandise comprises food or beverages.

20. The system of claim 13 wherein the heartbeat signal contains location information derived from other than a Global Positioning System.

* * * * *